(12) United States Patent
Anderson et al.

(10) Patent No.: US 8,893,030 B1
(45) Date of Patent: Nov. 18, 2014

(54) PERSONAL USER HIGHLIGHT FROM POPULAR HIGHLIGHTS

(75) Inventors: Emily Margaret Anderson, Seattle, WA (US); Tom Killalea, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 203 days.

(21) Appl. No.: 12/852,963

(22) Filed: Aug. 9, 2010

(51) Int. Cl.
*G06F 3/0481* (2013.01)

(52) U.S. Cl.
USPC .......................................................... 715/764

(58) Field of Classification Search
None
See application file for complete search history.

(56) References Cited

U.S. PATENT DOCUMENTS

| | | | | |
|---|---|---|---|---|
| 5,982,370 | A * | 11/1999 | Kamper ......................... | 715/760 |
| 7,392,466 | B2 * | 6/2008 | Pan et al. ...................... | 715/200 |
| 7,844,891 | B2 * | 11/2010 | Chandra ........................ | 715/208 |
| 8,555,198 | B2 * | 10/2013 | Beezer et al. ................. | 715/802 |
| 8,635,520 | B2 * | 1/2014 | Christiansen et al. ........ | 715/230 |
| 2006/0282778 | A1 * | 12/2006 | Barsness et al. .............. | 715/726 |
| 2007/0055926 | A1 * | 3/2007 | Christiansen et al. ........ | 715/512 |
| 2007/0234209 | A1 * | 10/2007 | Williams ....................... | 715/700 |
| 2008/0016164 | A1 * | 1/2008 | Chandra ........................ | 709/206 |
| 2008/0098294 | A1 * | 4/2008 | Le .................................. | 715/230 |
| 2009/0043799 | A1 * | 2/2009 | Morris .......................... | 707/102 |

OTHER PUBLICATIONS

Final Office Action for U.S. Appl. No. 12/852,869, mailed on Nov. 7, 2013, Emily Margaret Anderson, "User Highlight Match Indicator", 15 pages.
Non-Final Office Action for U.S. Appl. No. 12/852,869, mailed on Apr. 26, 2012, Emily Margaret Anderson et al., "User Highlight Match Indicator", 12 pages.
Office action for U.S. Appl. No. 12/852,869, mailed on Jun. 17, 2013, Anderson et al., "User Highlight Match Indicator", 14 pages.
Final Office Action for U.S. Appl. No. 12/852,869, mailed on Aug. 16, 2012, Emily Margaret Anderson et al., "User Highlight Match Indicator", 15 pages.

* cited by examiner

*Primary Examiner* — William Bashore
*Assistant Examiner* — Hien Duong
(74) *Attorney, Agent, or Firm* — Lee & Hayes, PLLC

(57) ABSTRACT

A popular highlight may be presented to a user who wishes to make the popular highlight a personal user highlight. Upon activation of a control, a personal user highlight is generated from the popular highlight. The user may then manipulate the resulting personal user highlight as they would any other user highlight.

21 Claims, 22 Drawing Sheets

STARTING POINT SCORES
702

SCORE FOR EACH WORD POSITION

| ORIGIN WORD | 1 | 2 | 3 | 4 | 5 | 6 | 7 | 8 | ... | 13 | ... | 18 | TOTAL SCORE | RANK |
|---|---|---|---|---|---|---|---|---|---|---|---|---|---|---|
| 1 | 2.00 | - | 0.67 | - | - | 0.17 | - | 0.13 | - | 0.08 | - | 0.06 | 3.09 | 2 |
| 2 | 1.00 | - | 1.00 | - | - | 0.20 | - | 0.14 | - | 0.08 | - | 0.06 | 2.49 | 3 |
| 3 | 0.67 | - | 2.00 | - | - | 0.25 | - | 0.17 | - | 0.09 | - | 0.06 | 3.24 | 1 |
| 4 | 0.50 | - | 1.00 | - | - | 0.33 | - | 0.20 | - | 0.10 | - | 0.07 | 2.20 | 5 |
| 5 | 0.40 | - | 0.67 | - | - | 0.50 | - | 0.25 | - | 0.11 | - | 0.07 | 2.00 | 7 |
| 6 | 0.33 | - | 0.50 | - | - | 1.00 | - | 0.33 | - | 0.13 | - | 0.08 | 2.37 | 4 |
| 7 | 0.29 | - | 0.40 | - | - | 0.50 | - | 0.50 | - | 0.14 | - | 0.08 | 1.91 | 8 |
| 8 | 0.25 | - | 0.33 | - | - | 0.33 | - | 1.00 | - | 0.17 | - | 0.09 | 2.17 | 6 |
| 14 | 0.14 | - | 0.17 | - | - | 0.11 | - | 0.14 | - | 0.50 | - | 0.20 | 1.26 | 10 |
| 18 | 0.11 | - | 0.13 | - | - | 0.08 | - | 0.09 | - | 0.17 | - | 1.00 | 1.57 | 9 |

POPULAR HIGHLIGHT START POINT
704

ENDING POINT SCORES
706

SCORE FOR EACH POSITION

| ORIGIN | 7 | 8 | 9 | 10 | 11 | 12 | 13 | 14 | 15 | 16 | 17 | TOTAL SCORE | RANK |
|---|---|---|---|---|---|---|---|---|---|---|---|---|---|
| 7 | 1.00 | - | - | - | - | 0.17 | 0.14 | 0.13 | - | 0.10 | 0.09 | 1.63 | 7 |
| 8 | 0.50 | - | - | - | - | 0.20 | 0.17 | 0.14 | - | 0.11 | 0.10 | 1.22 | 11 |
| 9 | 0.33 | - | - | - | - | 0.25 | 0.20 | 0.17 | - | 0.13 | 0.11 | 1.19 | 12 |
| 10 | 0.25 | - | - | - | - | 0.33 | 0.25 | 0.20 | - | 0.14 | 0.13 | 1.30 | 10 |
| 11 | 0.20 | - | - | - | - | 0.50 | 0.33 | 0.25 | - | 0.17 | 0.14 | 1.59 | 8 |
| 12 | 0.17 | - | - | - | - | 1.00 | 0.50 | 0.33 | - | 0.20 | 0.17 | 2.37 | 4 |
| 13 | 0.14 | - | - | - | - | 0.50 | 1.00 | 0.50 | - | 0.25 | 0.20 | 2.59 | 1 |
| 14 | 0.13 | - | - | - | - | 0.33 | 0.50 | 1.00 | - | 0.33 | 0.25 | 2.54 | 2 |
| 15 | 0.11 | - | - | - | - | 0.25 | 0.33 | 0.50 | - | 0.50 | 0.33 | 2.03 | 6 |
| 16 | 0.10 | - | - | - | - | 0.20 | 0.25 | 0.33 | - | 1.00 | 0.50 | 2.38 | 3 |
| 17 | 0.09 | - | - | - | - | 0.17 | 0.20 | 0.25 | - | 0.50 | 1.00 | 2.21 | 5 |
| 18 | 0.08 | - | - | - | - | 0.14 | 0.17 | 0.20 | - | 0.33 | 0.50 | 1.43 | 9 |

POPULAR HIGHLIGHT END POINT
708

FIG. 7

SUM FOR EACH POSITION

| USER HIGHLIGHT | 1 | 2 | 3 | 4 | 5 | 6 | 7 | 8 | 9 | 10 | 11 | 12 | 13 | 14 | 15 | 16 | 17 | 18 | TOTAL SCORE | RANK |
|---|---|---|---|---|---|---|---|---|---|---|---|---|---|---|---|---|---|---|---|---|
| A | - | - | 3.24 | - | - | - | 1.63 | - | - | - | - | - | - | - | - | - | - | - | 4.86 | 5 |
| B | - | - | - | - | - | - | - | 2.17 | - | - | - | - | - | - | - | - | 2.21 | - | 4.38 | 6 |
| C | 3.09 | - | - | - | - | - | - | - | - | - | - | - | 2.59 | - | - | - | - | - | 5.68 | 1 |
| D | - | - | - | - | - | 2.37 | - | - | - | - | - | - | - | 2.54 | - | - | - | - | 4.91 | 4 |
| E | - | - | 3.24 | - | - | - | - | - | - | - | - | 2.37 | - | - | - | - | - | - | 5.60 | 2 |
| F | 3.09 | - | - | - | - | - | - | - | - | - | - | - | - | - | - | 2.38 | - | - | 5.47 | 3 |
| G | - | - | - | - | - | - | - | - | - | - | - | - | - | - | - | - | - | 1.57 | 1.57 | 7 |

POPULAR HIGHLIGHT 1002

FIG. 10

PERSONAL USER HIGHLIGHT FROM POPULAR HIGHLIGHTS

BACKGROUND

Electronic devices such as electronic book readers ("eBook readers"), cellular telephones, portable media players, tablet computers, netbooks, desktop computers, and the like may display digital content such as electronic books ("eBooks") or other electronic media content to a user. Given the incredible growth in the availability of digital content, users are awash in information. For example, a single eBook reader may be capable of accessing and storing thousands of eBooks.

As a result, in the course of accessing content, users may highlight portions of the content considered relevant or interesting. These user highlights may be shared with other users in an online community. The sharing of highlights allows users new and exciting ways to interact with the content and with each other. For example, sharing of highlights provides useful feedback and a "Wisdom of the Crowds" effect to help identify particularly relevant or interesting parts of content. With large communities sharing highlights, tools to manage and utilize these highlights become desirable.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 7 depicts calculated results and a determined ranking for highlight starting points and highlight ending points.

FIG. 10 depicts calculated results and a determined ranking when the user highlight is considered the popular highlight.

DETAILED DESCRIPTION

Figure 1:
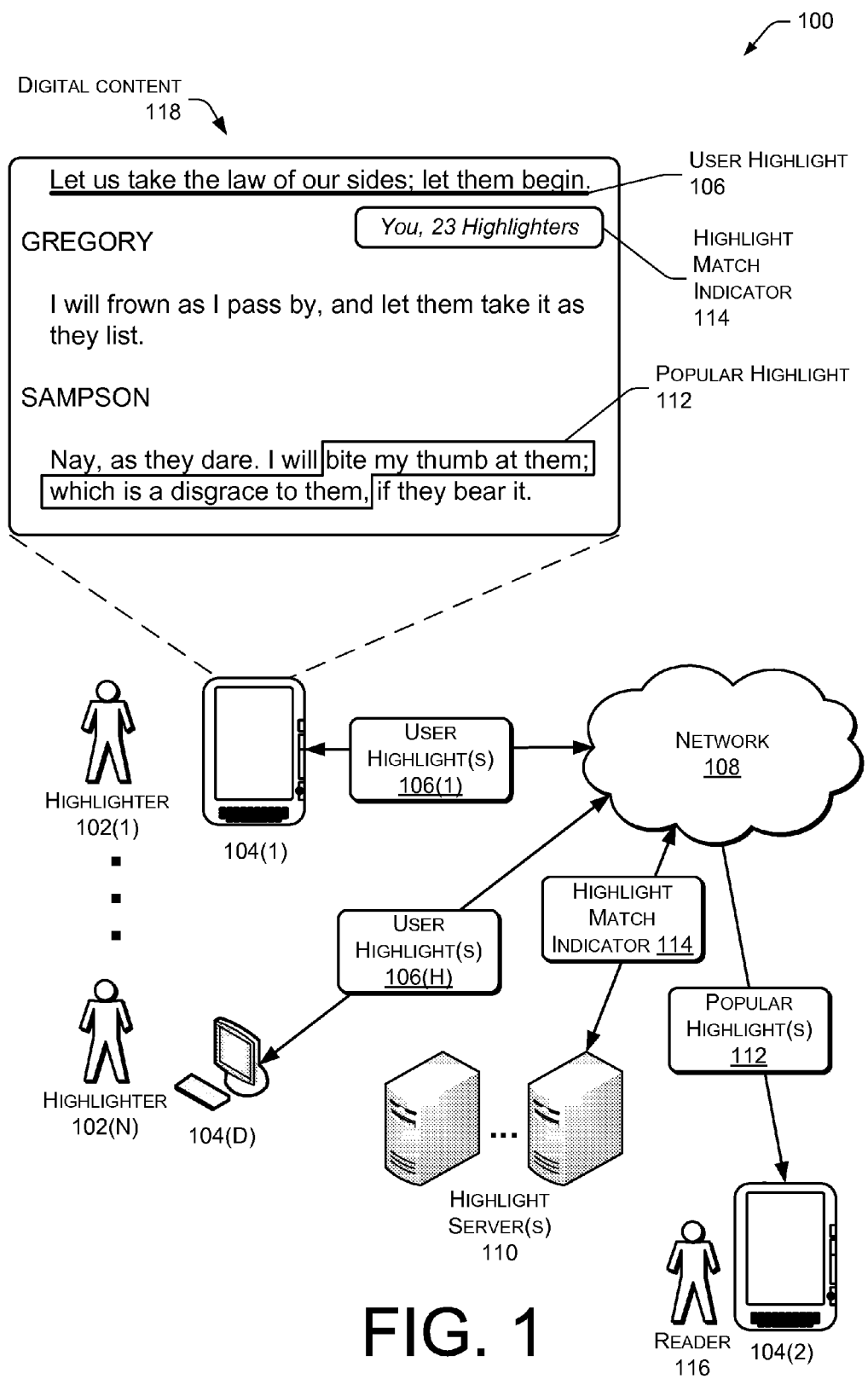
FIG. 1 is a block diagram of an illustrative network architecture configured to acquire user highlights and provide highlight-related functions including generating popular highlights and providing highlight match indicators to users.

Digital content such as eBooks have undergone tremendous growth. Devices such as eBook readers and ubiquitous smart phones bring content to large numbers of users. Some of these devices, such as eBook readers, may allow users to highlight or otherwise annotate the content. Furthermore, these devices provide for intercommunication between those large numbers of users, allowing sharing of all or a portion of these annotations. Thus, a collection of user annotations such as user highlights may be compiled and shared. However, given the ever expanding number of users in an online community accessing digital content such as eBooks, the correspondingly increasing set of community user annotations rapidly becomes unwieldy.

Described herein are various techniques to generate and display a popular highlight, a highlight match indicator, and a user highlight from a popular highlight. These techniques allow the user to access and manage highlight data generated by himself as well as other members of the online community.

"Highlighting," as used herein, is the selection of a portion or interval of digital content, considered to be of interest or relevance to a user. Highlights may comprise highlight points such as a start point, a mid-point, and end point, and so forth. The interval of the highlight extends across one or more positions. These positions may be individual characters, words, collections of multiple words, sentences, paragraphs, and so forth.

A highlight may be defined in several ways. For example, start and end points may define the highlight. Or the start point and a subsequent length may define the highlight. A signature or hash associated with the data in the highlighted portion may designate the highlight, and so forth. Highlights may either be user selected, entered automatically by monitoring usage characteristics such as dwell time on a passage, retrieved from physical highlights taken from a scanned physical document, and so forth.

Popular highlights are generated by a highlight server through calculation of position scores associated with highlight points, such as start points and end points within each user highlight. The position scores may be proportional to a distance between a designated origin position and each of the highlight points. For example, a highlight point at the origin designated would result in a greater score than a highlight point ten positions distant. The position scores contribute at least in part to rankings which generate popular highlights.

A particular user may generate a user highlight of a passage they find relevant or interesting. These user highlights may or may not correspond to highlights which rise to the level of a popular highlight. However, they are still important to the user. It may be desirable to encourage users to enter user highlights in order to, among other reasons, encourage the building of the set of community highlights, encourage active reading, and so forth. One technique to encourage this behavior is to provide positive reinforcement via the highlight match indicator. The highlight server generates highlight match indicators by analyzing the user highlights collected over time from the community of users and providing a notification when the user highlight matches previously entered highlights.

A user interface presents a passage, and also provides for a highlight control. The highlight control includes a function, which when executed generates the user highlight. Once generated, the highlight server determines if the user highlight corresponds to highlights entered by other users. When corresponding user highlights by other users have been found, the highlight match indicator prompt is presented to the user. In addition to indicating a match is present, other details such as a count of matches may also be presented.

The highlight match indicator thus provides feedback to the user that other users also selected the same (or a substantially similar) highlight that they selected, reinforcing a sense of accomplish and recognition from peers. In some implementations, a count of the number of users who made the matching highlights may be presented. For example, after selecting a user highlight, a prompt may be presented indicating that "You, and 23 highlights" highlighted the same portion.

The user may also manage highlights by generating a user highlight that is associated with the user from an existing popular highlight. This user highlight associated with the particular user is a "personal" user highlight. Where popular highlights may be visible to all members of the online community, the personal user highlights may be restricted to a particular user or subset of users within the community.

The user may wish to generate a personal user highlight in order to change the association, presentation, indexing, and so forth of that highlight. For example, a user may generate an outline of the content using highlights, and wishes to make sure that the material indicated by the popular highlight appears in that outline. The server or the user device may generate the personal user highlight from the popular highlight. From the user's point of view, the popular highlight is converted to a personal user highlight. However, the popular highlight remains intact as viewed by other members of the user community.

A user interface presents a popular highlight, personal highlights and also provides for a highlight control. The highlight control includes a function, which when executed generates the personal user highlight from the selected popular highlight. Once the user highlight has been generated, display of the popular highlight may be suppressed and the user highlight presented instead.

The user may wish to generate a user highlight from a popular highlight. For example, the user may find a popular highlight resonates well with them, and wishes to mark it as their own. By activating a highlight control, the user may generate a personal user highlight from a popular highlight.

Users may also configure display of highlights within the user interfaces presented on their devices. Configuration options may include setting a percentage of popular highlights to show, suppressing popular highlights when there is a corresponding personal user highlight, whether to show a highlight match indicator when the highlight has been entered by at least a pre-determined number of people, and so forth.

While highlights are described in the context of textual content, the concepts described herein are also applicable to highlighting of sections of other digital content, such as audio recordings, video recordings, or the like. Also, while processes are described as being implemented using eBook reader devices, digital content may be highlighted and/or displayed by electronic devices of an eBook other than eBook reader devices, such as cellular telephones, portable media players, tablet computers, netbooks, notebooks, desktop computers, and the like.

Popular Highlight Architecture

FIG. 1 is a block diagram of an illustrative network 100 configured to acquire user highlights, provide highlight match indicators, and determine popular highlights. A user who adds highlights to digital content is a "highlighter." Illustrated are several highlighters 102(1) through 102(N). Each user may have one or more devices 104(1) through 104(D). The devices 104 may include electronic book reader devices 104(1) and personal computers 104(D), however, other devices such as laptops, netbooks, media players, smartphones and so forth are also possible.

Each highlighter 102(1)-(N) may generate user highlights 106(1) through 106(H) amongst their respective copies of a digital content, or a commonly accessible single copy, via their corresponding devices 104(1)-(D). Each highlight encompasses or designates a portion considered of interest within the content.

The device 104 may communicate via a network 108 to a highlight server 110. The network 108 may comprise the Internet, a cable television network, wireless network, wired network, wireless wide area network, etc. The highlight server 110 may comprise a single server, cluster of servers, data center, and so forth. In some implementations, some aspects or functions of the highlight server 110 may be distributed to one or more of the devices 104(1)-(D).

The highlight server 110 may store user highlights 106(1)-(H) received from the highlighters 102(1)-(N). The highlight server 110 may further generate popular highlights 112, based at least in part upon the user highlights 106(1)-(H) received from the highlighters 102(1)-(N), and optionally store the popular highlights 112 in conjunction with the digital content item. The popular highlights 112 form a selected subset of the user highlights made by the highlighters 102(1)-(N) to the digital content. This subset may have maximum size limitations, or content limitations. For example, the popular highlights may provide no more than a predetermined percentage (e.g., two percent) of a body of the digital content to comply with conditions set forth by the owner of intellectual property rights in the digital content. Alternatively, the owner of the digital content may choose to opt out of permitting popular highlights altogether. In another example, popular highlights from a portion of a digital content may be restricted or prohibited. For example, highlights in a last chapter revealing the solution in a mystery novel may not be displayed, or be hidden until clicking to view a "spoiler" highlight.

The highlight server 110 may then provide the popular highlights 112 to a reader 116 or to the community of users that includes the highlighters 102(1)-(N) and the reader 116. A reader 116 is a user who does not choose to, or is not permitted to, enter user highlights 106 for the digital content and hence may not be considered a "highlighter." In this illustration, the reader 116 has a device 104(2) that receives the popular highlights 112 via the network 108 from the highlight server 110. The transfer of highlights may be initiated by the device 104 (as a "pull" of data), by the server 110 (as a "push" of data), or a combination. The device 104 then presents the digital content, the popular highlights 112, or both to the reader 116.

The highlight server 110 may also generate a highlight match indicator 114 upon acquiring a user highlight 106 which matches or exceeds a pre-determined threshold number of previously stored user highlights 106. For instance, suppose the pre-determined threshold number is 20 highlights and the highlighter highlights a passage which has been highlighted 23 times. The highlight match indicator 114 is presented showing that 23 others have highlighted this same passage. This provides for the serendipitous reinforcement of the highlighter 102 that their user highlight was important enough for others to have also highlighted it.

Additionally, the highlight server 110 may receive a request from the highlighter 102 to generate a personal user highlight from a popular highlight. For example, suppose the user finds the popular highlight sufficiently interesting to add to a collection of personal user highlights, and decides to generate the personal user highlight from the popular highlight. During this operation, the highlight server 110 accesses the interval of content defined by a selected popular highlight, and generates a personal user highlight associated with the particular highlighter 102. This personal user highlight may then be stored within the highlight server 110 for access by the user from one or more devices 104(1)-(D).

The highlight server 110 may also synchronize highlights acquired from multiple versions of an eBook which are in use. For example, highlights from a first edition of an eBook may be synchronized and displayed in corresponding locations within a second edition of the eBook.

Also illustrated is an example of a user interface presented by the device 104(1). Presented in this example a portion of digital content 118, for example a passage from "*Romeo and Juliet*." Within this passage, the user highlight 106 is depicted, along with a corresponding highlight match indicator 114. Also shown is a popular highlight 112 which may be used to generate a personal user highlight.

Figure 2:
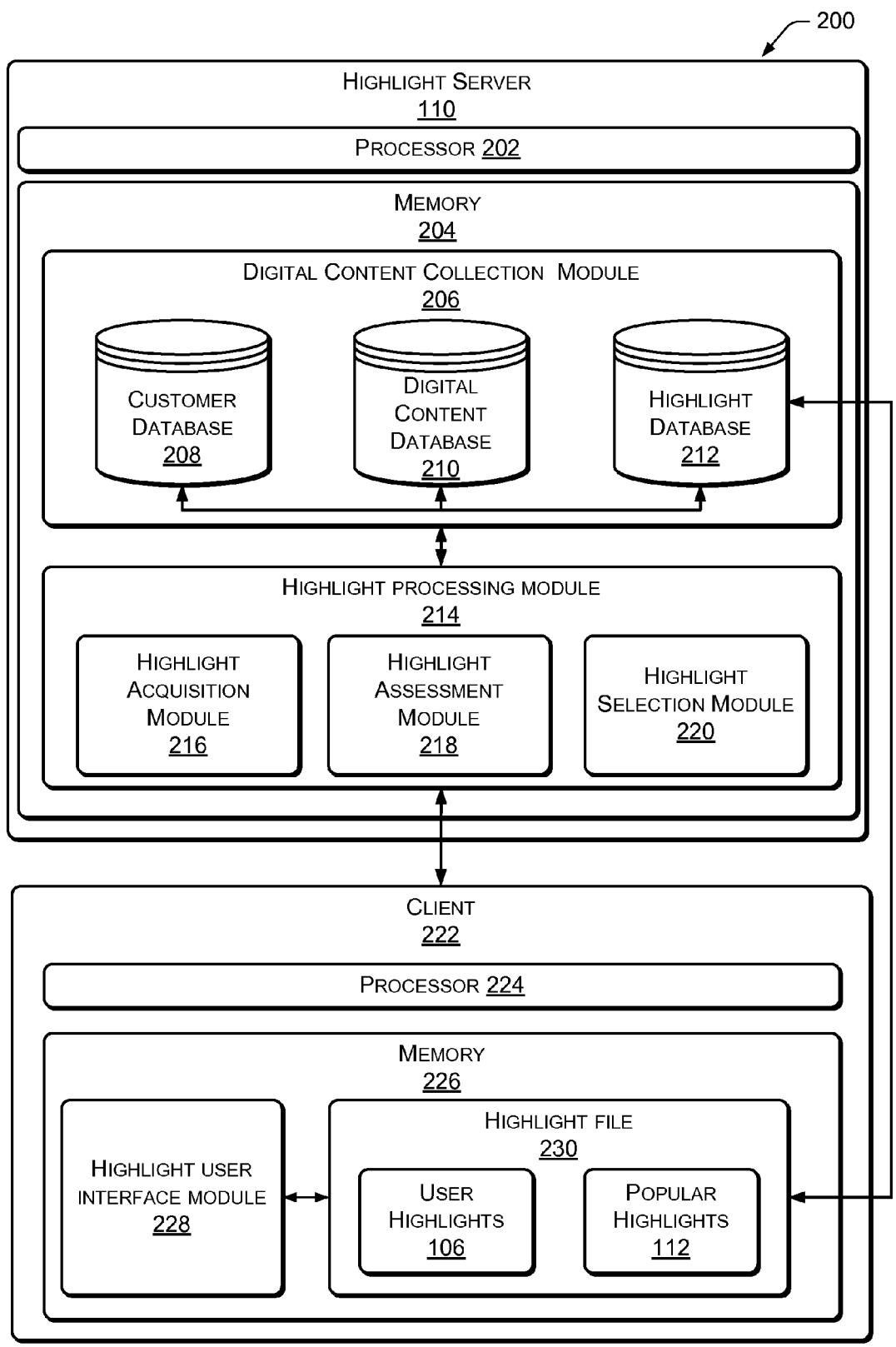
FIG. 2 is a block diagram of an illustrative architecture of a highlight processing environment configured to provide highlight match indicators and generate personal highlights from popular highlights.

FIG. 2 is a block diagram of an illustrative highlight environment 200. The highlighting environment 200 includes one or more servers 110, comprising a processor 202 and a memory 204. The memory 204 may include computer-readable storage media (CRSM). The CRSM may be any available physical media that can be accessed by a computing device to implement the instructions stored thereon. CRSM may include, but is not limited to, random access memory (RAM), read-only memory (ROM), electrically erasable programmable read-only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

Stored in the memory 204 is a digital content collection module 206. The digital content collection module 206 may comprise a customer database 208, a digital content database 210, and a highlight database 212, coupled to one another. The customer database 208 comprises information about users participating in the community. The digital content database 210 comprises digital content, for example music, books, movies, and so forth. Digital content may be accessed in common. That is, each user with access to a particular content may access a common copy of that content, or each user may access their own discrete copy of content stored in a digital locker.

The highlight database 212 stores user highlights 106, popular highlights 112, and so forth. The highlights may comprise specified intervals of digital content, a highlight status indicator, a version or edition number of the digital content which the highlights are for, and so forth.

A highlight processing module 214 is also present within memory 204 and coupled to digital content collection module 206. The highlight processing module 214 provides several highlight-related functions performed by several modules. These modules include a highlight acquisition module 216, a highlight assessment module 218, and a highlight selection module 220. The highlight acquisition module 216 acquires the user highlights 106(1)-(H) from the highlighters 102(1)-(N) via the network 108.

The highlight assessment module 218 determines if a user highlight from the user matches one of the user highlights already stored in the highlight database 212. When a match is determined, the highlight match indicator 114 may be generated. As described above, the highlight match indicator 114 when presented to the user via the devices 104(1)-(D) provides a positive reinforcement to the user about the merit of the highlight.

The highlight assessment module 218 also determines scores based at least in part upon the user highlights 106(1)-(H) when popular highlight generation occurs. The highlight selection module 220 utilizes the scores to select one or more popular highlights 112.

The highlight selection module 220 is also configured to accept a user's command via the device 104 to generate a user highlight 106 from the popular highlight 112. Upon receiving the user command, the highlight selection module 220 generates the user highlight 106 corresponding to a selected popular highlight 112. This user highlight 106 may be associated with the particular highlighter 102(1)-(N) who initiated the command.

The highlight processing module 214 is in communication with a client 222, which may represent any one of the devices 104 shown in FIG. 1. The client 222 comprises a processor 224 and a memory 226. The memory 226 may include computer-readable storage media as described above. Stored in the memory 226 is a highlight user interface (HUI) module 228. The HUI module 228 may present the highlight match indicator 114, user highlights 106, or popular highlights 112 stored in the memory 226, or a portion thereof, or retrieved from the server 110, depending on highlight viewing rights the user may have. In some implementations, highlights may be retrieved from the highlight database 212 via the network 108. Additionally, the user of the client 222 may have highlight submission rights, allowing the user to submit highlights to the server 110 for inclusion in the highlight database 212. When a user has highlighting rights, a highlight file 230 may comprise highlights corresponding to the digital content on the client 222. The highlight file 230 stored in the memory 226 may be provided to the server 110 for incorporation into the highlight database 212.

Popular Highlights

As described above, a highlight match indicator 114 may be presented to the highlighter 102 showing their user highlight 106 corresponds to highlights made by other highlighters. However, these other user highlights may not rise to the level of a popular highlight. The following discussion describes the generation of popular highlights 112 in greater depth. Once a popular highlight 112 has been determined, the highlighter 102 may also choose to generate a personal user highlight from it.

Figure 3:
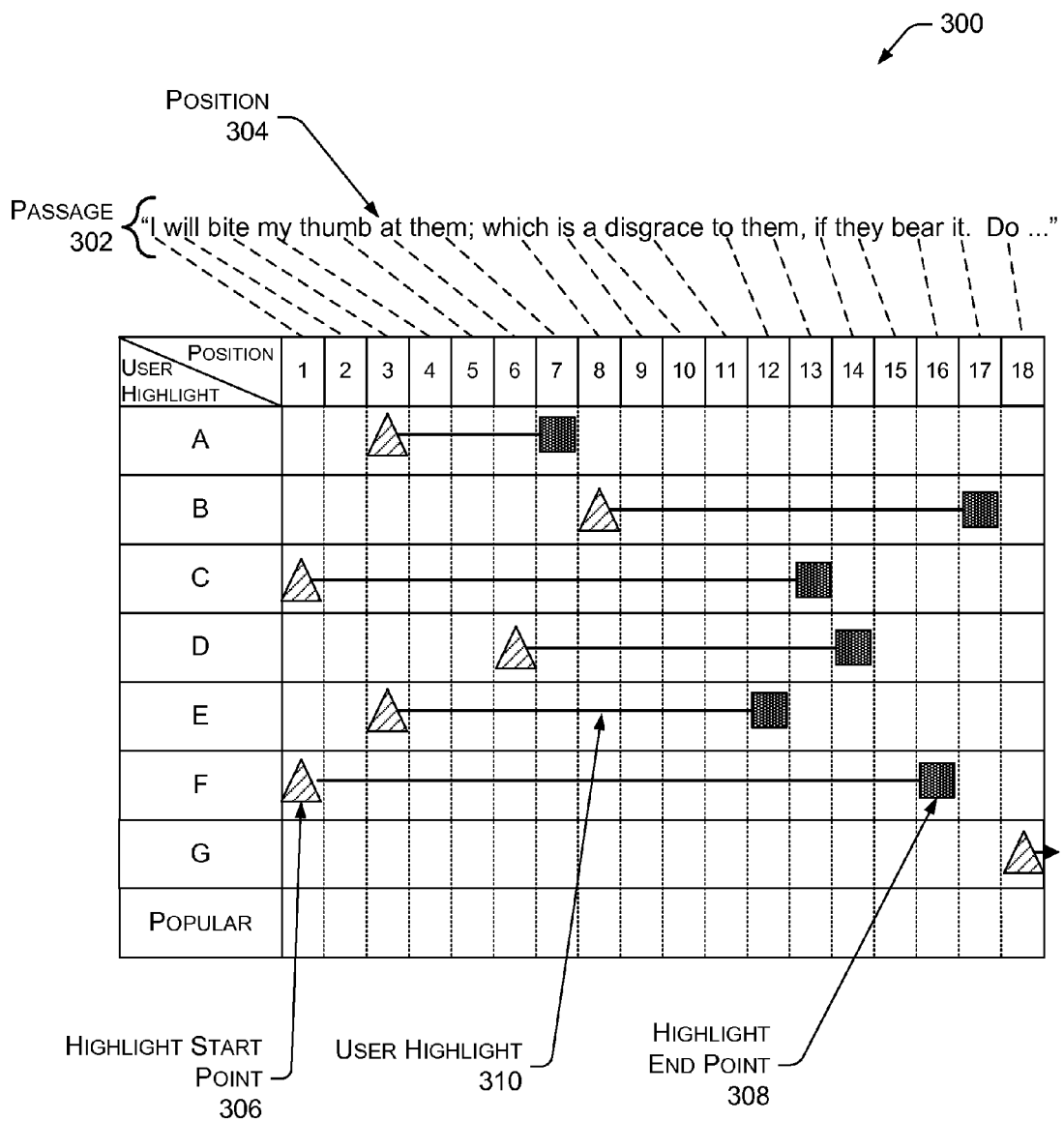
FIG. 3 is a highlight diagram depicting an illustrative passage and user highlights from several users, along with a popular highlight derived at least in part from the user highlights when the start and end points for each user highlight are considered independently of one another.

FIG. 3 is a highlight diagram 300 depicting an illustrative passage and user highlights from several users. Shown is a passage 302 from the book *Romeo and Juliet*: "I will bite my thumb at them; which is a disgrace to them, if they bear it." In this example, each position 304 designates a word. For example, position five is the word "thumb" while position eleven is the word "disgrace." In other implementations, positions may be individual characters, words, collections of multiple words, sentences, paragraphs, and so forth.

The highlight diagram 300 shows a matrix with rows corresponding to positions 1-18 in the passage 302 and user highlights A-G in columns. The user highlights A-G may be from a single user or a plurality of users. For simplicity of illustration and not by way of limitation, seven user highlights A-G and eighteen positions are shown.

Within the highlight diagram 300, highlights are shown as intervals having a start point and an end point. In this illustration, user highlight start points 306 are designated with triangles, while highlight end points 308 are designated with squares. A horizontal line between these points designates the interval encompassed by the highlight. For example, arrow 310 indicates that user highlight E extends from a start point of position 3 (i.e., corresponding to the word "bite") to an end point of position 12 (i.e., corresponding to the word "to").

Given the sample of seven highlights A-G within this one passage 302, it is apparent that displaying the user highlights from the community would result in clutter and distraction. This is particularly so when the community may extend to thousands of users, or more, many of whom may be highlighting this particular passage. Thus, it is beneficial to generate one or more popular highlights as described next, to which attention of the user's may be drawn.

The highlight diagram 300 visualizes the various user highlights from which a popular highlight is derived. Specifically, the seven user highlights A-G are considered in the determination of the popular highlight as described next.

Figure 4:
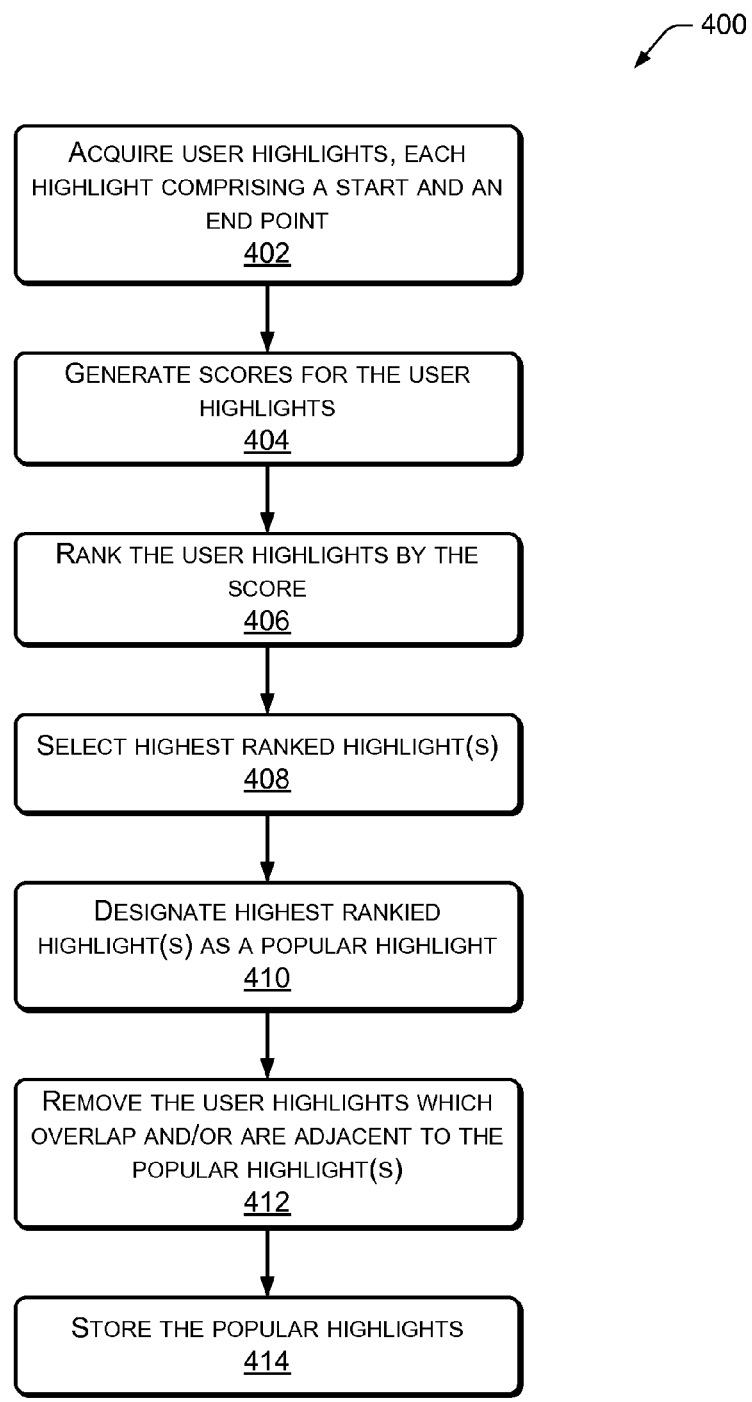
FIG. 4 is a flow diagram of an illustrative process of determining popular highlights.

FIG. 4 shows an illustrative process 400 of determining popular highlights. The process 400 (as well as processes described below with respect to FIGS. 5, 6, 9, 15, and 21) is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 400 (as well as processes 500, 600, 900, 1500, and 2100) is described with reference to the architectures of FIGS. 1-2 and the highlight diagram of FIG. 3.

At 402, the highlight processing module 214 acquires a plurality of user highlights 106(1)-(H). Each highlight comprises highlight point types. Highlight point types comprise a highlight start point 306, a mid-point, a highlight end point 308, and so forth. The highlight points define an interval of the highlight across one or more positions in the content.

At 404, the highlight processing module 214 generates a score for the plurality of user highlights 106, such as user highlights A-G as shown in FIG. 3. Highlight points may be scored for each position in the digital content, as will be described below in more detail with respect to FIG. 5. A relative proximity of other highlight points may contribute to at least a portion of the score.

At 406, the highlight processing module 214 ranks the user highlights 106, such as the user highlights A-G, by score. For example, the scores may be sorted in descending order of highest score to lowest score, and assigned a numerical rank.

At 408, the highlight processing module 214 selects a highest ranked highlight. In some implementations, a top k (where k is a non-zero integer) number of highest ranked highlights may be selected. For example, a top five highest ranked highlights may be selected. At 410, the highlight processing module 214 designates the highest ranked highlight as a popular highlight 112.

Because the popular highlight 112 is considered to represent the community's assessment of a passage of particular interest or relevance, the user highlights 106(1)-(H) may be removed from the highlight database 212. At 412, the highlight processing module removes at least a portion of user highlights 106 which overlap or are adjacent to the popular highlight 112. This removal may comprise deletion, masking from future consideration, reducing scoring weight, and so forth.

Two or more highlights overlap when their respective highlight intervals share one or more common positions. A pre-determined overlap threshold may be used to limit which user highlights are removed. For example, the pre-determined overlap threshold may be set to two positions, inclusive, resulting in a highlight having an overlap of two positions being removed. For example, as shown in FIG. 3, user highlights A and D overlap by two positions (i.e., 6 and 7). The pre-determined overlap threshold may be static or dynamically configured. For example, the pre-determined overlap threshold may be varied in response to a ratio comprising highlight length to passage length is less than one.

The highlight processing module 214 is also configurable to remove user highlights 106 adjacent to the popular highlight 112. Two highlights are adjacent to one another when their respective points (such as start points and end points) are within a pre-determined adjacency distance of the popular highlight. For example, suppose the pre-determined adjacency distance is three positions, inclusive. As shown in FIG. 3, the user highlight G starts two positions away from the end of the user highlight F, which is within the pre-determined adjacency distance. Thus, user highlights F and G are deemed adjacent to one another. When the user highlight 106 is within the pre-determined adjacency distance of the popular highlight 112, the user highlight 106 may be removed. Removal of the user highlights 106 adjacent to the popular highlight 112 removes clutter and improves presentation and relevance to the user.

At 414, the highlight processing module 214 stores the popular highlights 112. The popular highlights 112 may be stored in the highlight database 212, the highlight file 230, and so forth. Once stored, the user may access the popular highlights 112 to see portions of the digital content considered relevant or interesting by the community.

Generating Position Scores

Figure 5:
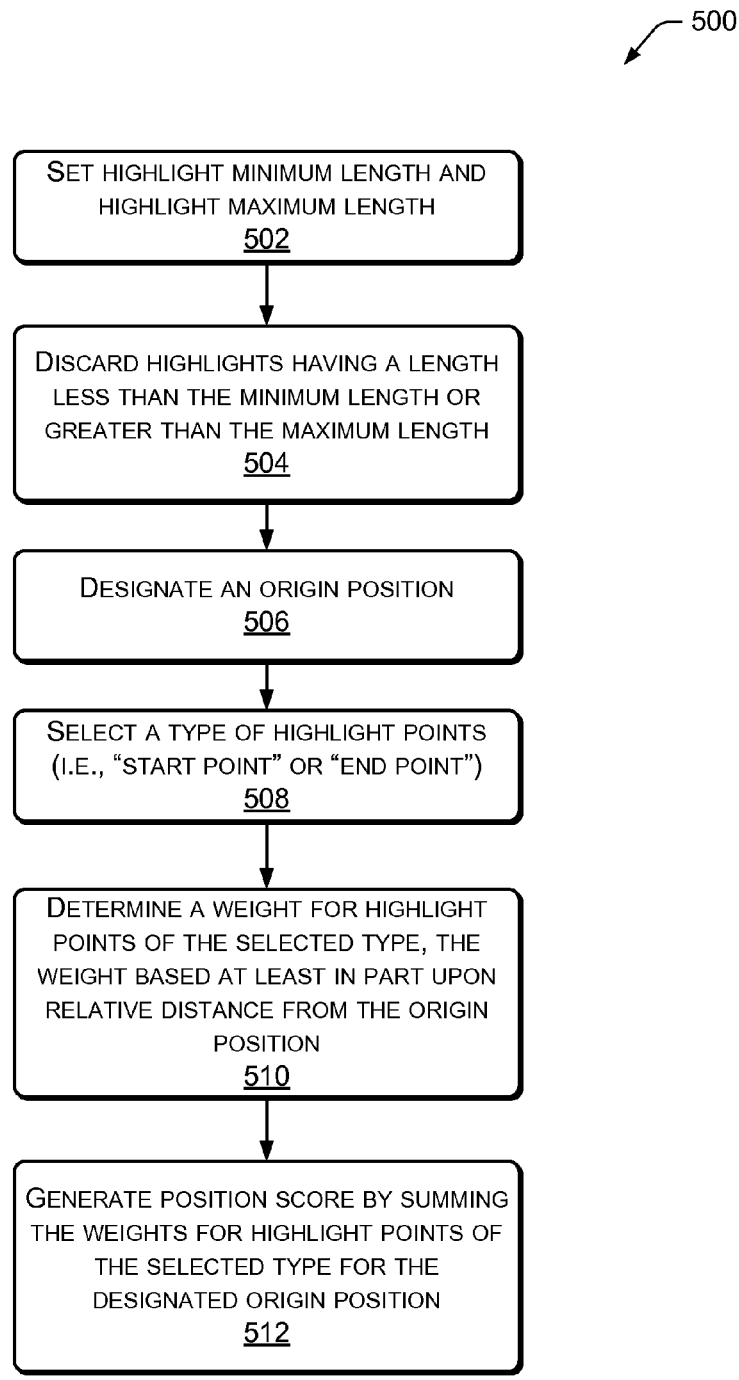
FIG. 5 is a flow diagram of an illustrative process of generating position scores associated with user highlights.

FIG. 5 is a flow diagram of an illustrative process 500 of generating position scores. In some implementations, this process may be used to generate the scores described above at block 404 of FIG. 4.

Scoring assigns a numerical value to the user highlight 106, or to portions thereof, such as the highlight points. At 502, a highlight minimum length and a highlight maximum length are set within the highlight assessment module 218. Minimum and/or maximum lengths for individual highlights or other thresholds may be pre-determined or dynamically adjusted. For example, non-fiction programming books might have a minimum highlight length greater than that of fictional books. Highlight length thresholds may also be determined dynamically, taking into account some book-specific characteristics. For example, a book with a low Flesch-Kincaid readability score may have a minimum highlight length that is less than a book with a high Flesch-Kincaid readability score.

At 504, the highlight assessment module 218 discards (or otherwise disregards) the highlights having a length less than the minimum length, greater than the maximum length, or both. This removes individual user highlights 106 which may be too expansive or to brief to be considered useful as a popular highlight 112.

At 506, the highlight assessment module 218 designates an origin position. Positions comprise individual characters, words, sentences, paragraphs, and so forth. For example, where positions designate words, a first position is the first word. An origin position is a designated position from which a distance used in position scoring is measured. The positional distance from highlight points to the origin position is used, at least in part, to generate the scores associated with the highlights and highlight points. In some implementations, the origin position is incremented throughout the digital content, building a score for each position.

At 508, the highlight assessment module 218 selects a type of highlight point. Highlights may comprise highlight points such as a start point, a mid-point, and end point, and so forth. Types of highlight points thus include start points, mid-points, end points, and so forth.

At 510, the highlight assessment module 218 determines weights for the highlight points of the selected type. In some implementations, this weight is proportionate based at least in part upon a relative distance from the origin position to the highlight point. For example, a greater score is accorded to highlight points closer to the origin than highlight points which are more distant. The weight may incorporate a decay function using the relative distance. This decay function may be linear, exponential, logarithmic, and so forth. In some implementations a pre-determined maximum distance for calculation of the highlight point weight may be set. For example, the pre-determined maximum distance for calculation may be twelve positions away from the origin, disregarding highlight points more distant than this.

At 512, the highlight assessment module 218 generates a position score by summing the weights for highlight points of the selected type for the designated origin position. For example, suppose start points are the selected type of highlight points. The position score for origin position one includes the sum of start points in the origin position plus the proportionate scores of start points in other positions. Likewise, similar position scores may be generated for mid-point, end-point, and other types of highlight points.

Ranking Start and End Points Independently

Figure 6:
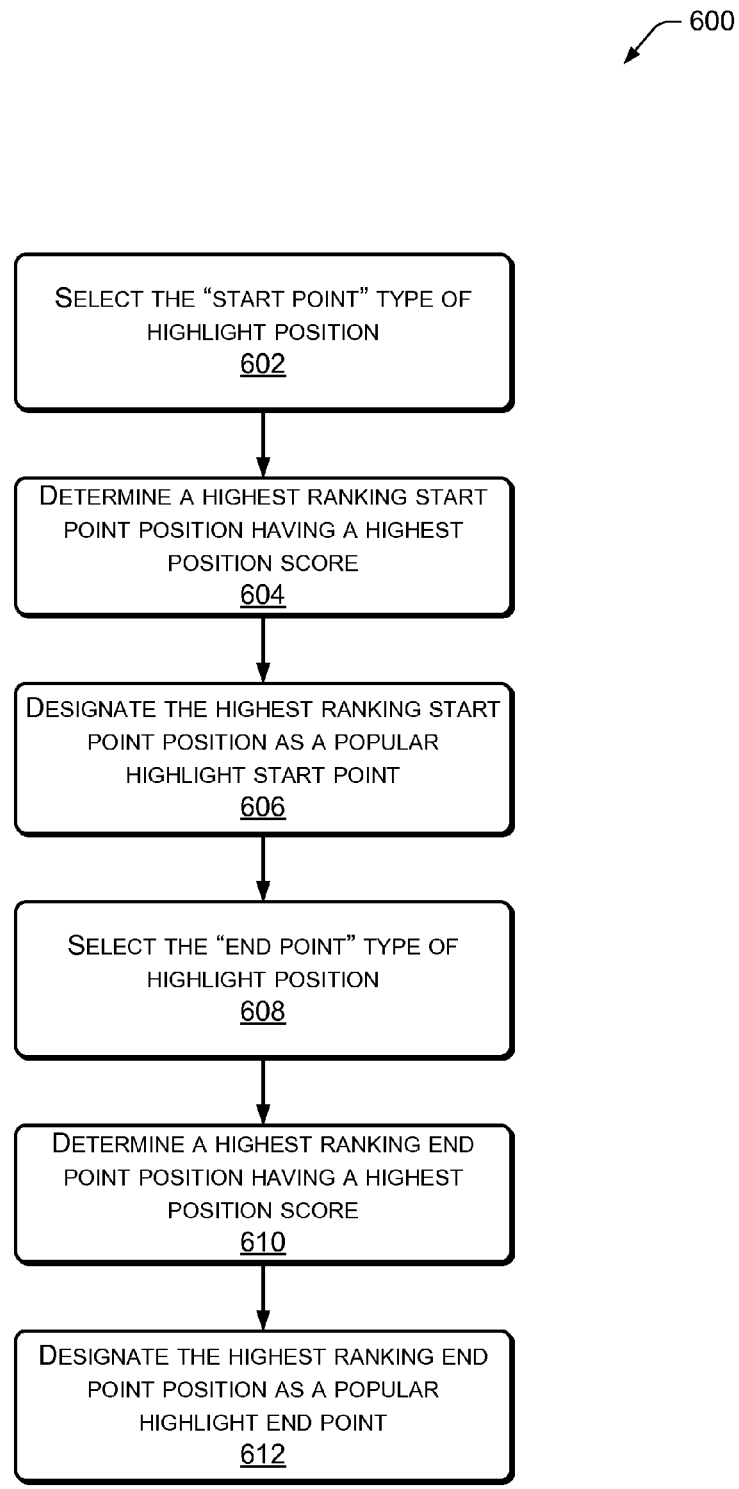
FIG. 6 is a flow diagram of an illustrative process of ranking user highlights such that start and endpoints of user highlights are considered independently of one another.

Once scores have been generated, such as described above with regards to FIG. 5, they may be ranked. FIG. 6 is a flow diagram of an illustrative process 600 of ranking user highlights such that start and end points of user highlights are considered independently of one another. In some implementations, this process may be used to rank the user highlights by the score as described above at block 406 of FIG. 4.

At 602, the highlight selection module 220 selects the "start point" type of highlight position. At 604, a highest ranking start point position having a highest position score is determined. In one implementation, the highest ranking position score in a list of position scores for the start point type of highlight position is found. At 606, the position corresponding to this highest ranking position score is designated as a popular highlight start point.

At 608, the end point type of highlight position is selected. At 610, the highlight selection module 220 determines a highest ranking end point position having a highest position score. At 612, the highest ranking end point position is designated as a popular highlight end point. Thus, the highlight selection module 220 may be configured to determine the start and end points for the user highlights 106 independently of one another.

FIG. 7 depicts calculated results 700 for generating position scores and ranking highlight starting points and highlight ending points of the highlights of FIG. 3. Starting point scores 702 are shown for the starting points shown in FIG. 3. In this example, position scores were calculated as described above with respect to FIG. 6. For example, in one implementation an origin position is designated. A count is made for each position of a selected highlight type and summed to form C. A score for each position is calculated by the following equation, where $C_P$ is the sum of counts for the selected highlight type at position P and D is the absolute distance between P and the origin position.

$$\text{Position Score} = C_P \frac{1}{D+1} \qquad \text{(Equation 1)}$$

For example, assume an origin position of the third word, "bite." Start highlights as shown are present at positions 1, 3, 6, 8, 13, and 18 with counts of 2, 2, 1, 1, 1, and 1, respectively. Given the positions and counts above and the origin position, at position 3 the position score=2*(1/(0+1)=2. Likewise, at position 6, the position score=1*(1/(3+1))=0.25. Thus, highlights which are farther away from the origin position are weighted proportionately less. In other implementations, other algorithms may be used to calculate the position scores.

As shown here, when the origin is position is 3, the total score of 3.24 is the greatest of the starting point total scores the positions calculated for the highlights shown in FIG. 3. Thus, the first ranked position 3 is a popular highlight start point 704.

Similarly, ending point scores 706 are shown for the ending points shown in FIG. 3, and are calculated in a similar fashion. This table indicates that for highlight ending points, when position 13 is the origin, the highest score of 2.59 is achieved. Thus, position 13 is a popular highlight end point 708.

Figure 8:
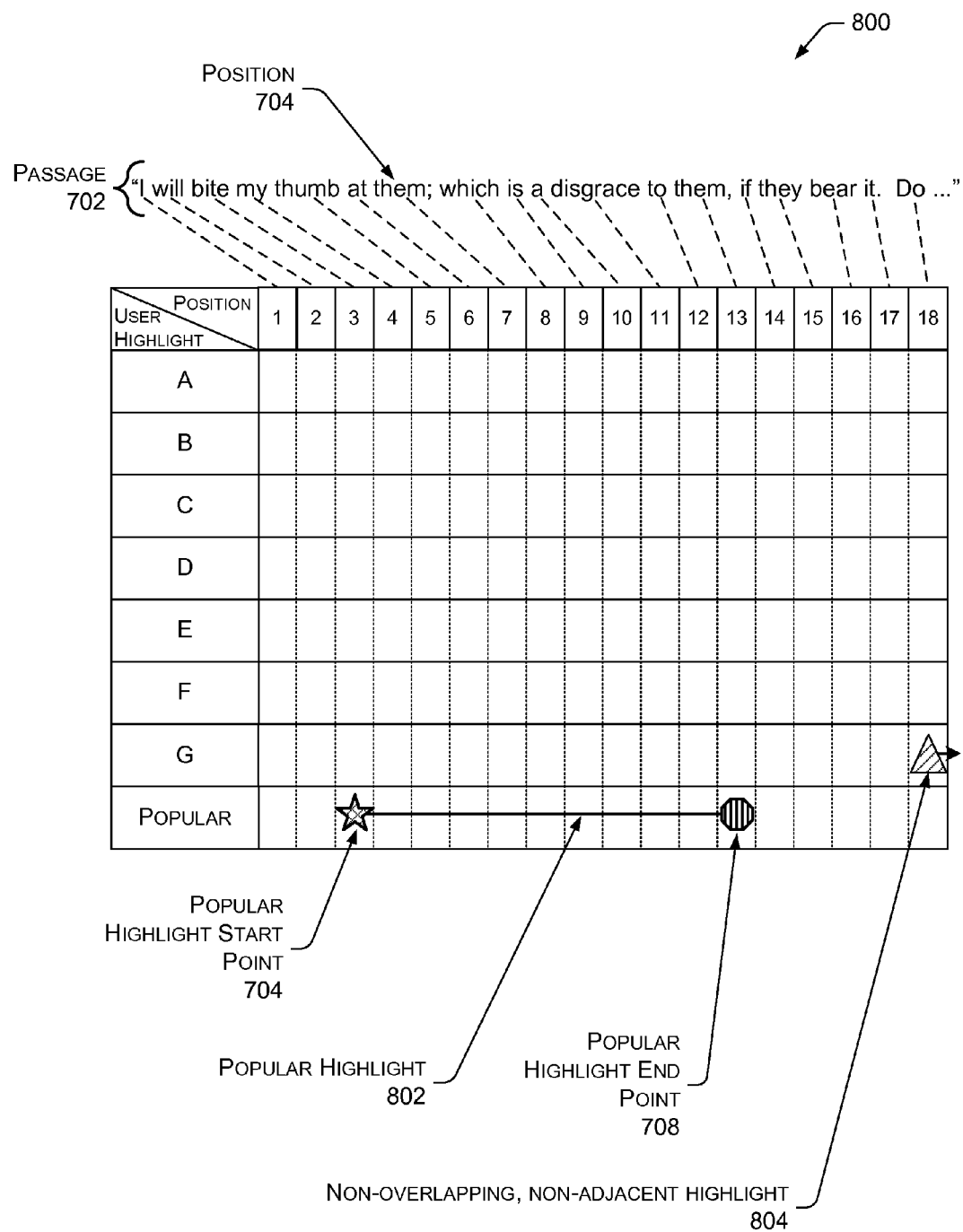
FIG. 8 is a highlight diagram depicting a popular highlight for the illustrative passage of FIG. 7 and after overlapping and/or adjacent user highlights have been removed.

FIG. 8 is a highlight diagram 800 depicting a popular highlight for the illustrative passage after overlapping and adjacent user highlights have been removed. The popular highlight start point 704, designated with a star, and the popular highlight end point 708 designated with an octagon, as determined above define a popular highlight 802. As shown, the popular highlight 802 extends from position 3 to position 13. Consider that the popular highlight 802 as shown does not correspond directly to any of the user highlights A-G. This is because the popular highlight 802 has been generated using the process set forth in FIG. 6 where start and end points for each user highlight are considered independently of one another.

User highlights A-G that overlapped the popular highlight 802 have been discarded. Also shown is user highlight G with a start position of 18 and extending to the right. The user highlight G is outside of a pre-determined adjacency distance, in this example three, of the popular highlight 802. Thus, user highlight G remains.

As a result of the removal of user highlights which overlap, which are within a pre-determined adjacency distance, or both, the highlights are decluttered. The removal process may be iterated as more user highlights or popular highlights are considered.

Designating a User Highlight as a Popular Highlight

While the start and end points of the highlights may be considered independently of one another to generate a highlight, such as described above with regards to FIG. 6, in another implementation use of intact user highlights may prove desirable.

Figure 9:
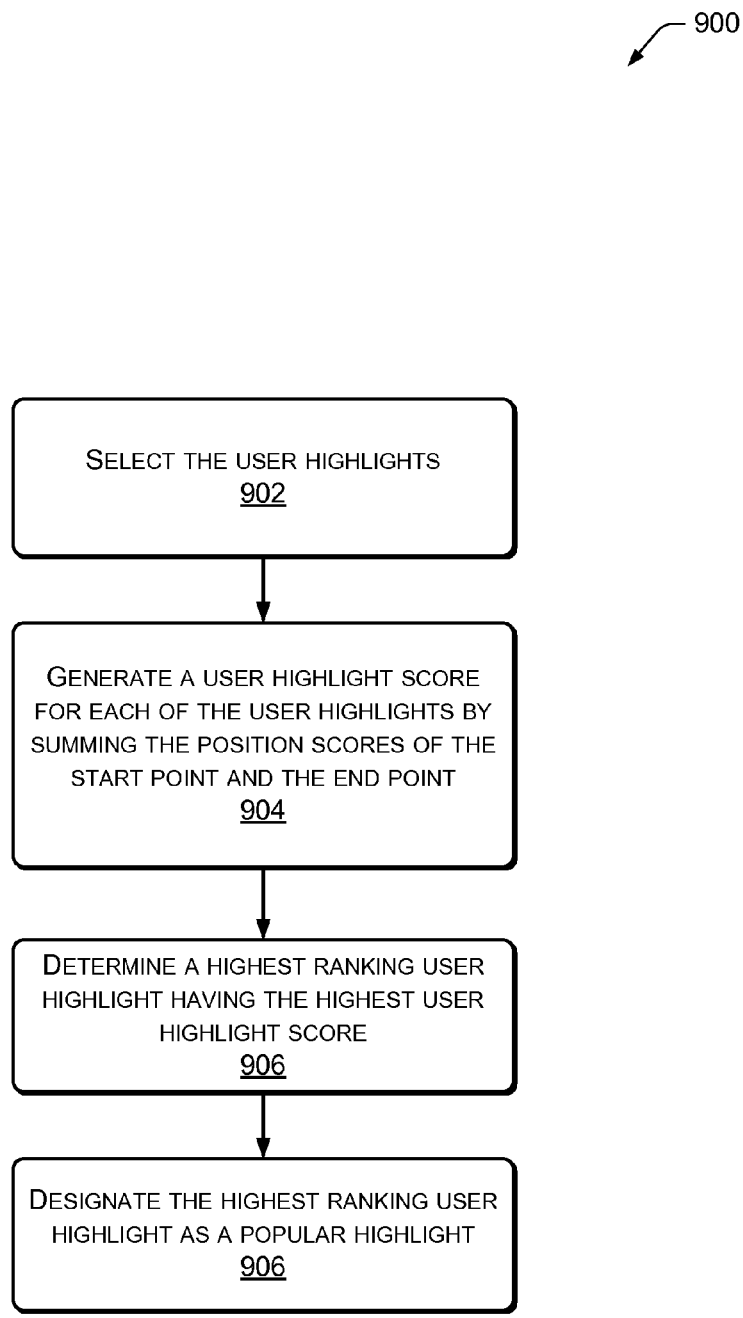
FIG. 9 is a flow diagram of an illustrative process of ranking user highlights such that the scores of start and endpoints for each user highlight are considered together.

FIG. 9 is a flow diagram of an illustrative process 900 of ranking user highlights such that the scores of start and endpoints for each user highlight are considered together. As a result, an existing user highlight 106 is designated as a popular highlight. In this way, the highlight may more naturally start and end due to the original human selection, rather than the automated selection of independent start and end points which may have been obtained from different user highlights, as described above with regards to FIG. 6.

At 902, the user highlights 106 are selected. For example, consider the highlights A-G of FIG. 3. At 904, the highlight selection module 220 generates a user highlight score for each of the user highlights 106 by summing the position scores of the start point and the end point. The generation of position scores is described in more detail above with respect to FIG. 5 with calculated results shown in FIG. 7.

At 906, the highlight selection module 220 determines a highest ranking user highlight having the highest user highlight score. At 908, the highest ranking user highlight is designated as a popular highlight 112.

This process allows the selection of a highlight made by one of the users, which may provide a more coherent highlight. As a result of this selection process, a highlight by a single user out of many may be designated as a popular highlight.

FIG. 10 depicts calculated results 1000 when start and endpoints of user highlights are considered together. As described above with respect to FIG. 9 and FIG. 3, user highlight scores may be generated by summing the position scores of the start points and end points for each of the user highlights A-G. For example, user highlight C has a start point of position 1 and an end point of position 13. As shown in the calculated results 1000 and as described above with regards to FIG. 8, position 1 has a calculated position score of 3.09. Likewise position 13 has a calculated position score of 2.59. When summed, 3.09+2.59=5.68 results in highlight C having the highest rank. Thus, highlight C which begins at position 1 and ends at position 13 is designated as a popular highlight 1002.

Figure 11:
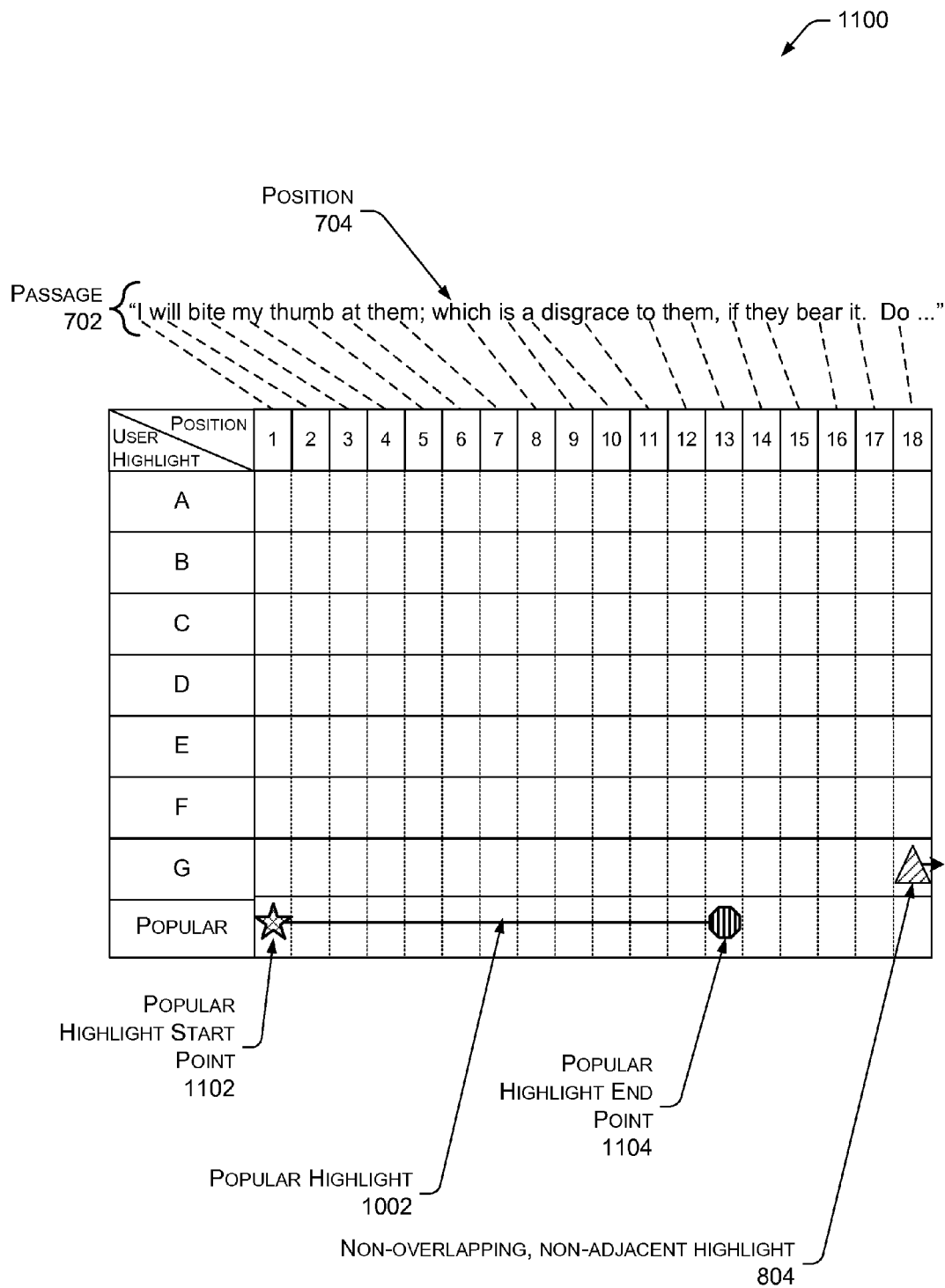
FIG. 11 is a highlight diagram depicting the popular highlight for the illustrative passage of FIG. 3 and after overlapping user highlights have been removed.

FIG. 11 is a highlight diagram 1100 depicting the popular highlight 1002 derived at least in part from the user highlights of FIG. 3 when start and endpoints of user highlights are considered together. In this illustration, the popular highlight 1002 begins with popular highlight start point 1102 in position 1 and ends with popular highlight end point 1004 in position 13. The popular highlight 1002 corresponds to the user highlight C, and differs from the popular highlight 802 of FIG. 8. This difference occurs because the popular highlight 1002 considers each of the user highlights A-G as entities, as described with regards to FIG. 9.

As described above with respect to FIG. 8, overlapping and/or adjacent user highlights have been removed. As a result, the highlights are decluttered, allowing easier user access and improving the importance of the popular highlight 1002. Also as described above, the non-overlapping, non-adjacent highlight 804 remains as well.

Highlight User Interface (HUI) with Designated Popular Highlights

Figure 12:
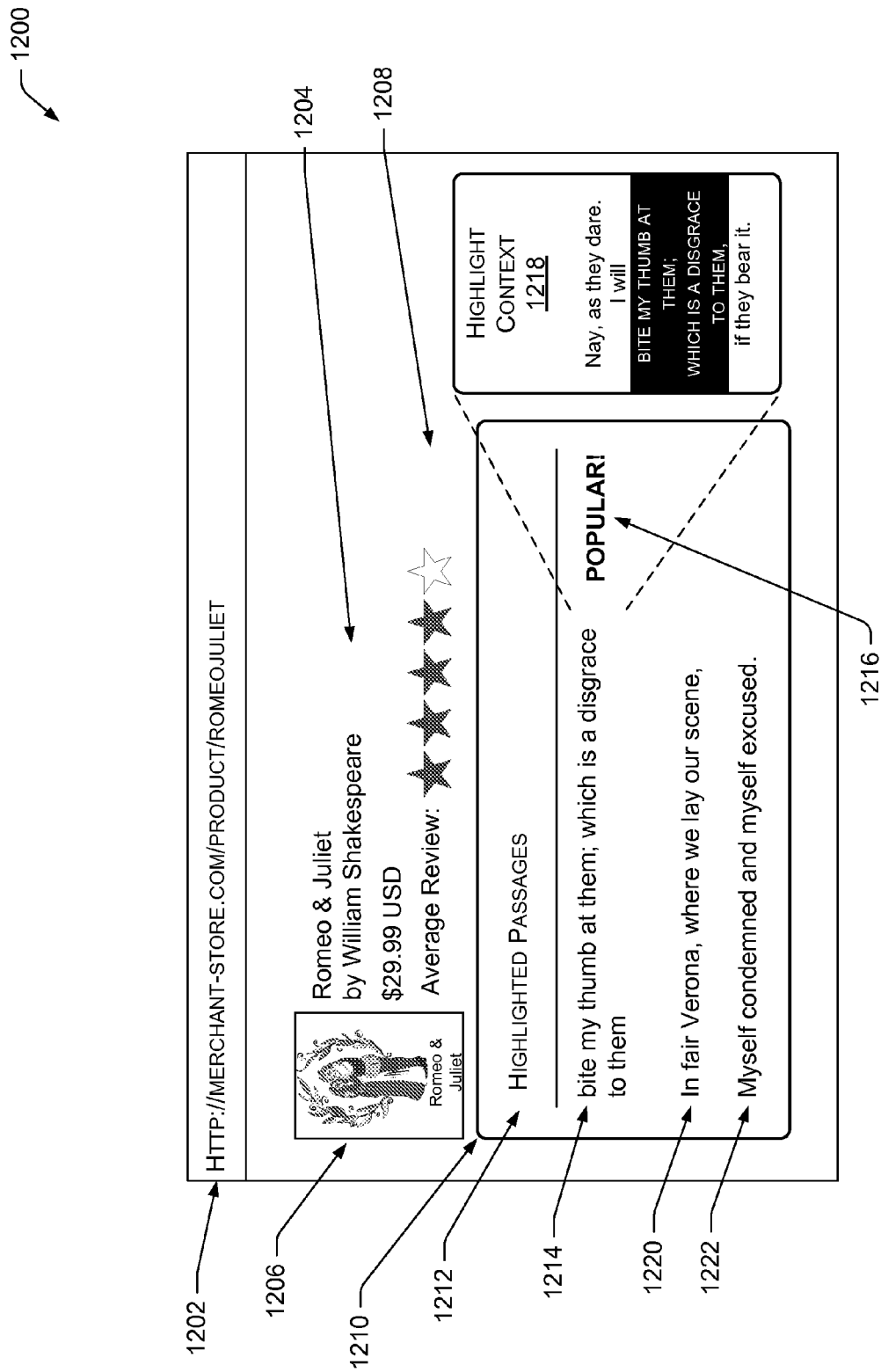
FIG. 12 depicts an illustrative browser interface showing popular highlights in an electronic book.

FIG. 12 depicts an illustrative browser interface 1200. The illustrative browser interface shows highlights in an electronic book version of "*Romeo and Juliet.*"

A web address 1202 is shown in the browser interface to access an online merchant store selling books or popular highlights or both. Details about the illustrative book "*Romeo and Juliet*" are presented to the user, including title, author, and price 1204. A thumbnail picture of the book's cover 1206 is also shown. In this example, a thumbnail image of the cover for the eBook "*Romeo and Juliet*" is presented. An indication of user reviews of the book 1208 may also be presented. For example, as shown here the average review is four stars out of five, indicating that William Shakespeare's work is favored by readers.

A highlight viewing interface 1210 may present highlighted passages of selected digital content. An indication of the highlighted passages 1212 is presented to the user. Here, there are three highlighted passages 1212 shown from various portions of the book. These highlighted passages 1212 may include a popular highlight 1214, which may be designated as such with a popular highlight indicator 1216 comprising a legend, an icon, text, formatting, and so forth. In this example, the popular highlight indicator 1216 comprises the word "Popular!" presented proximate to the corresponding popular highlight 1214. Additional highlight context 1218 information is shown, such as in response to a user activating a control. The additional user context 1218 may provide a larger excerpt, such as the passage, statistics about the highlight, and so forth.

Also presented are other highlights, such as user highlights 1220 and 1222, which may be associated with the particular user accessing the browser interface 1200. Thus, the user may access popular highlights as well as their own. In some implementations, a graphic display showing the relative location of highlights within a representation of the content may be presented.

Highlight Match Indicator

Figure 13:
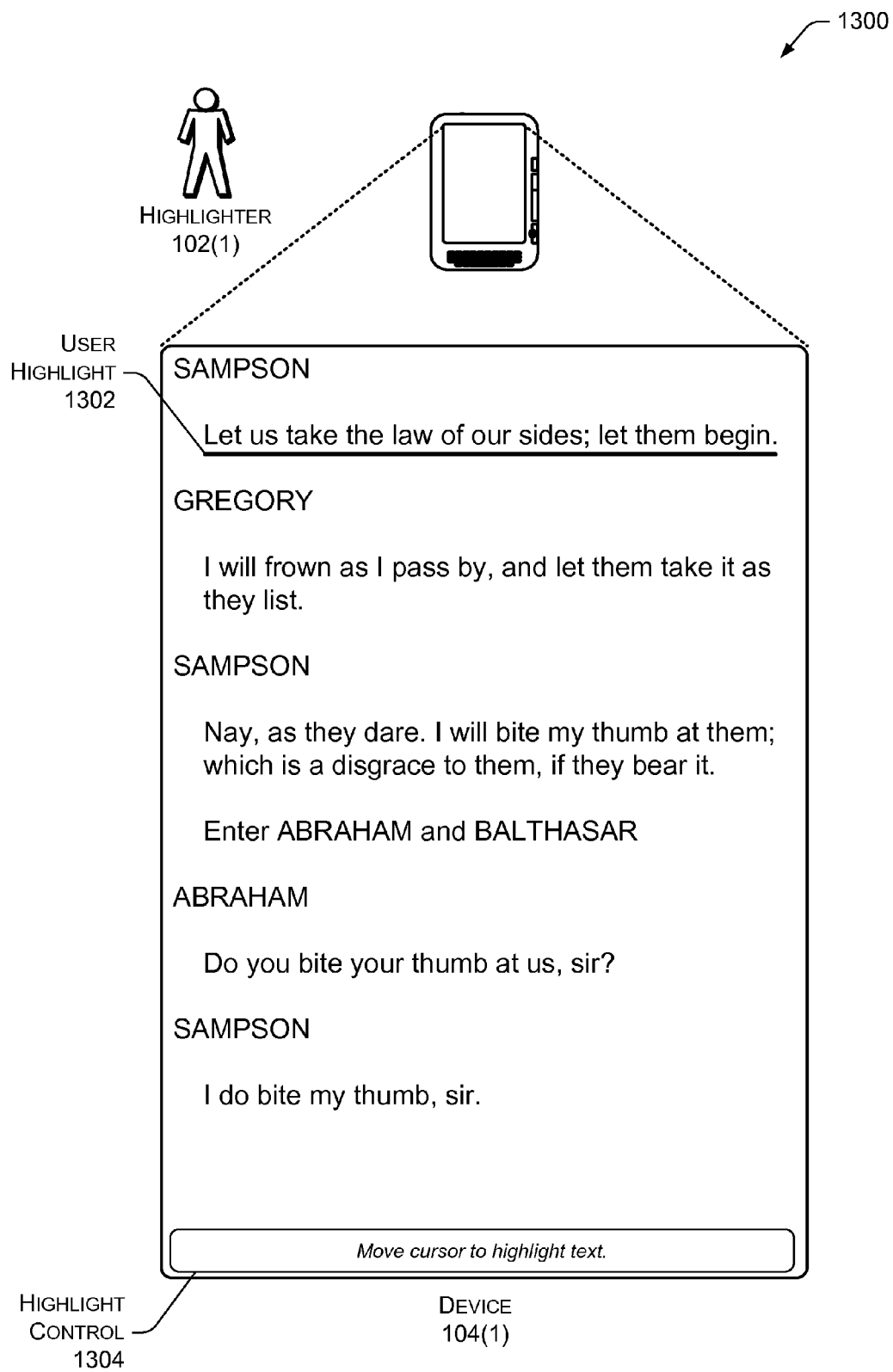
FIGS. 13 and 14 illustrate a user interface (UI) as rendered on an eBook reader device showing selection of a user highlight and a subsequent highlight match indicator.

As described next with regards to FIGS. 13 and 14, highlights may also be presented via the user interface while reading the electronic book. While reading, the highlighter 102 may see highlight match indicators 114 indicating their user highlight 106 corresponds to those of other highlighters 102.

The community of users, such as shown in FIG. 1 comprising highlighters 102(1)-(N), may be actively engaged in reading by providing indications of serendipitous matches with the highlights of other users. Providing highlight match indicators 114 to the highlighters 102(1)-(N) when they define a highlight also made by another user brings this sense of excitement and community to the process of reading resulting from these serendipitous matches. This feedback to the user encourages them to realize that they are not just reading alone, but rather are reading with others in the community.

Receiving the highlight match indicator 114 also affirms that you have not only highlighted something relevant or interesting to you, but that the same highlight was of relevance or interest to others. It builds a sense of identification and resonance with the other community participants. Additionally, by providing the highlight match indicator 114 after the user has defined a highlight, the user interface presented to the user remains uncluttered.

Furthermore, encouraging users to highlight or otherwise annotate content increases the valuable knowledge embodied in the community and stored within the highlight servers 110.

This valuable knowledge may then be provided to the users through various ways, such as the generation and presentation of popular highlights 112.

As described above, users may enter a user highlight 106 which may or may not rise to the level of the popular highlight 112. FIG. 13 illustrates such a situation with a user interface 1300 (UI) as rendered on an eBook reader device 104(1) by the highlight user interface (HUI) module 228 and showing a selection of a user highlight. The selection may be made via movement of a cursor by way of a touch sensor, button, joystick, mouse, trackball, vocal command, and so forth. In this illustration the highlighter 102(1) has selected a user highlight 1302. The user highlight 1302 is indicated with an underline beneath a sentence from "*Romeo and Juliet*" which reads "Let us take the law of our sides; let them begin." A highlight control 1304 indicates to the highlighter 102(1) that he may move the cursor to highlight another portion of the text.

Figure 14:
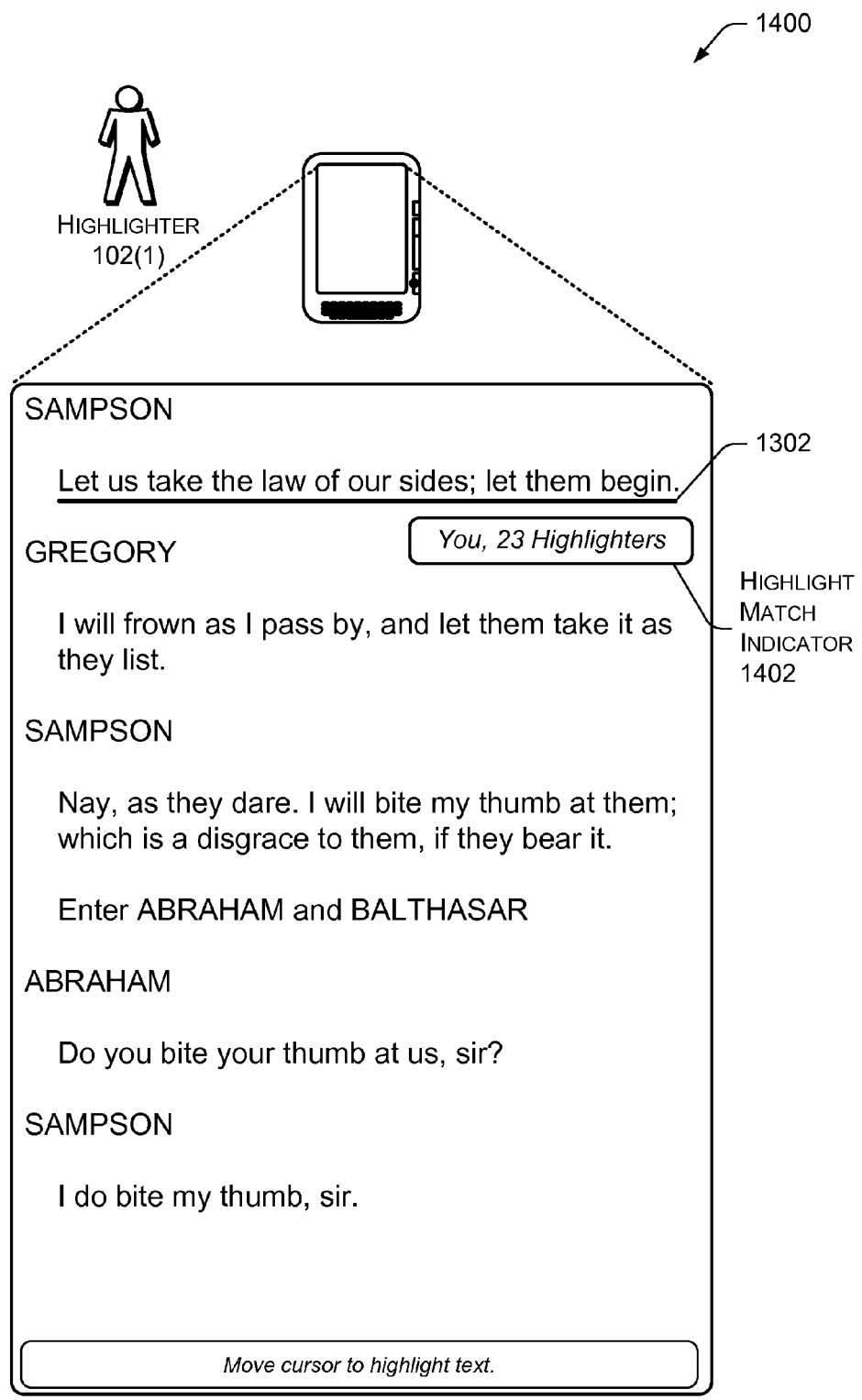

FIG. 14 illustrates a UI 1400 as rendered on the eBook reader device by the HUI module 228 and showing a highlight match indicator 1402. As described above with regards to FIG. 2, the highlight assessment module 218 within the highlight server 110 determines when a user highlight from the user matches one of the user highlights already stored in the highlight database 212. When a match is determined, the highlight assessment module 218 generates a highlight match indicator 114. In addition to an indication that the match has occurred, the highlight assessment module 218 may provide additional information such as the number of matches, geographic location of the matches, and so forth. The device, such as device 104(1) as shown here, then presents the highlight match indicator 114 to the user.

As shown here, the highlight assessment module 218 has returned the highlight match indicator 1402 after the highlighter 102(1)'s selection of user highlight 1302. The highlight match indicator 1402 informs the highlighter 102(1) that 23 other users have also highlighted the user highlight 1302. This provides reinforcement to the highlighter 102(1) that the highlighted portion was significant enough to resonate with other highlighters 102.

The highlight match indicator 1402 may be presented as a bubble as shown, as an icon, a variation in the formatting of text presented, and so forth. In other implementations the highlight match indicator 1402 may comprise an audio response such as a spoken phrase, pre-determined sound, and so forth, indicating the match.

Figure 15:
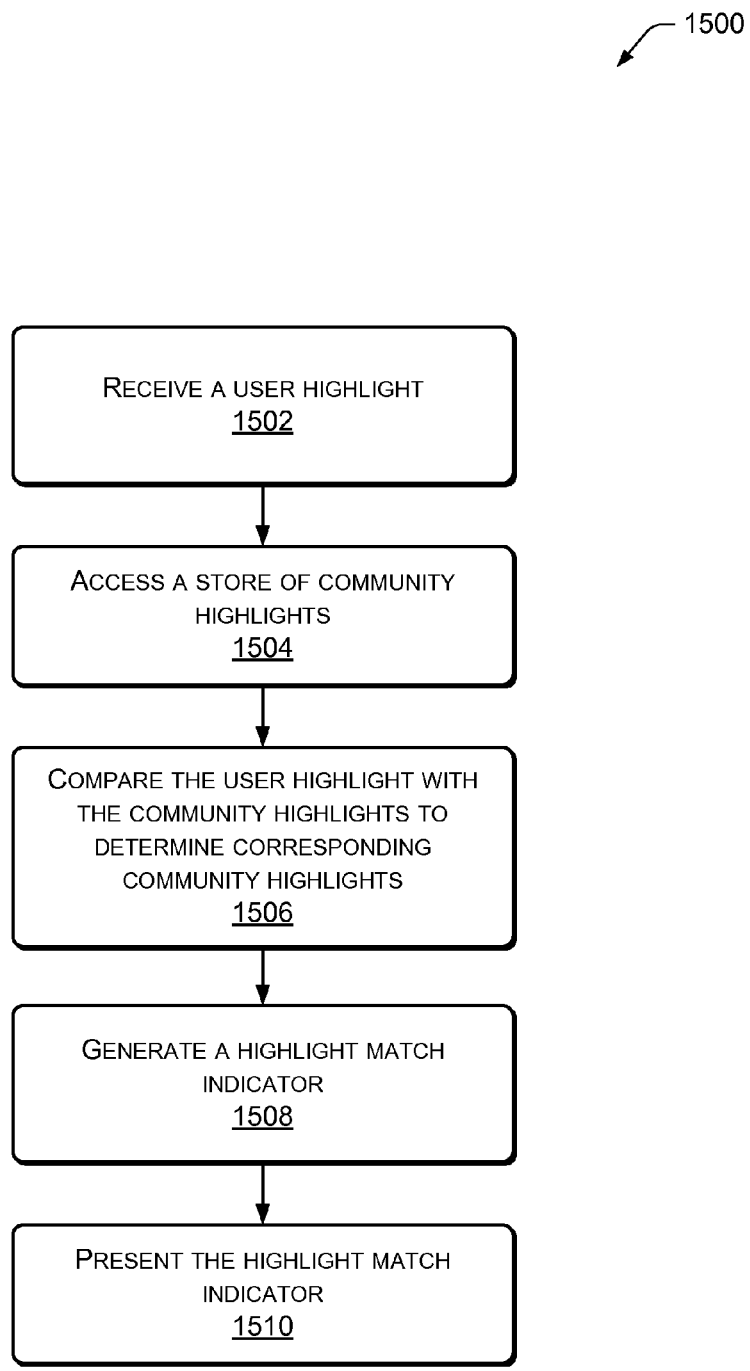
FIG. 15 is a flow diagram of an illustrative process of presenting a highlight match indicator.

FIG. 15 is a flow diagram of an illustrative process 1500 of presenting a highlight match indicator. At 1502, the highlight acquisition module 216 receives a user highlight 1302, for example from highlighter 102(1) as described above with regards to FIG. 13. At 1504, the highlight assessment module 218 accesses a store of community highlights such as stored within the highlight database 212.

At 1506, the highlight assessment module 218 compares the user highlight 1302 with the community highlights gathered from other users, for example highlighters 102(2)-(N), to determine corresponding previously stored community highlights. Correspondence may comprise an exact or a partial match with existing community highlights.

At 1508, when the user highlight 1302 from highlighter 102(1) corresponds to at least a pre-determined threshold number of previously stored user highlights, the highlight assessment module 218 generates a highlight match indicator 1402. The pre-determined threshold number of previously stored user highlights may be configured by the user, by a system administrator of the server 110, and so forth. For example, the user may configure the system to present highlight match indicators when the highlight has been entered by at least seven other users. In some implementations the threshold may be dynamically adjusted.

At 1510, the highlight processing module 214 presents the highlight match indicator 1402 to the highlighter 102(1). As described above, the highlight match indicator 1402 may as a bubble, icon, text, audio prompt, and so forth.

Generating a Personal User Highlight from a Popular Highlight

As described next with regards to 16-20, popular highlights may also be presented via the user interface while reading the electronic book. The highlighter 102 may also choose to generate a personal user highlight from the popular highlight 112.

Popular highlights 112 provide a useful tool for users to see what the community of users have considered of interest or relevant. However, in some situations, a user may wish to generate a user highlight associated with their user account from a popular highlight. This user highlight associated with their particular user account becomes a "personal" user highlight.

Users may wish to generate a personal user highlight in order to change the association, presentation, indexing, and so forth of that highlight. For example, a user may generate an outline of the content using highlights, and wishes to make sure that the material indicated by the popular highlight appears in that outline. From the user's point of view, the popular highlight is converted to a personal user highlight. In actuality, a new user highlight is generated which corresponds to the popular highlight, and presentation of the popular highlight may, but need not be, suppressed. The popular highlight itself remains intact, and may still be viewed by other members of the user community.

Figure 16:
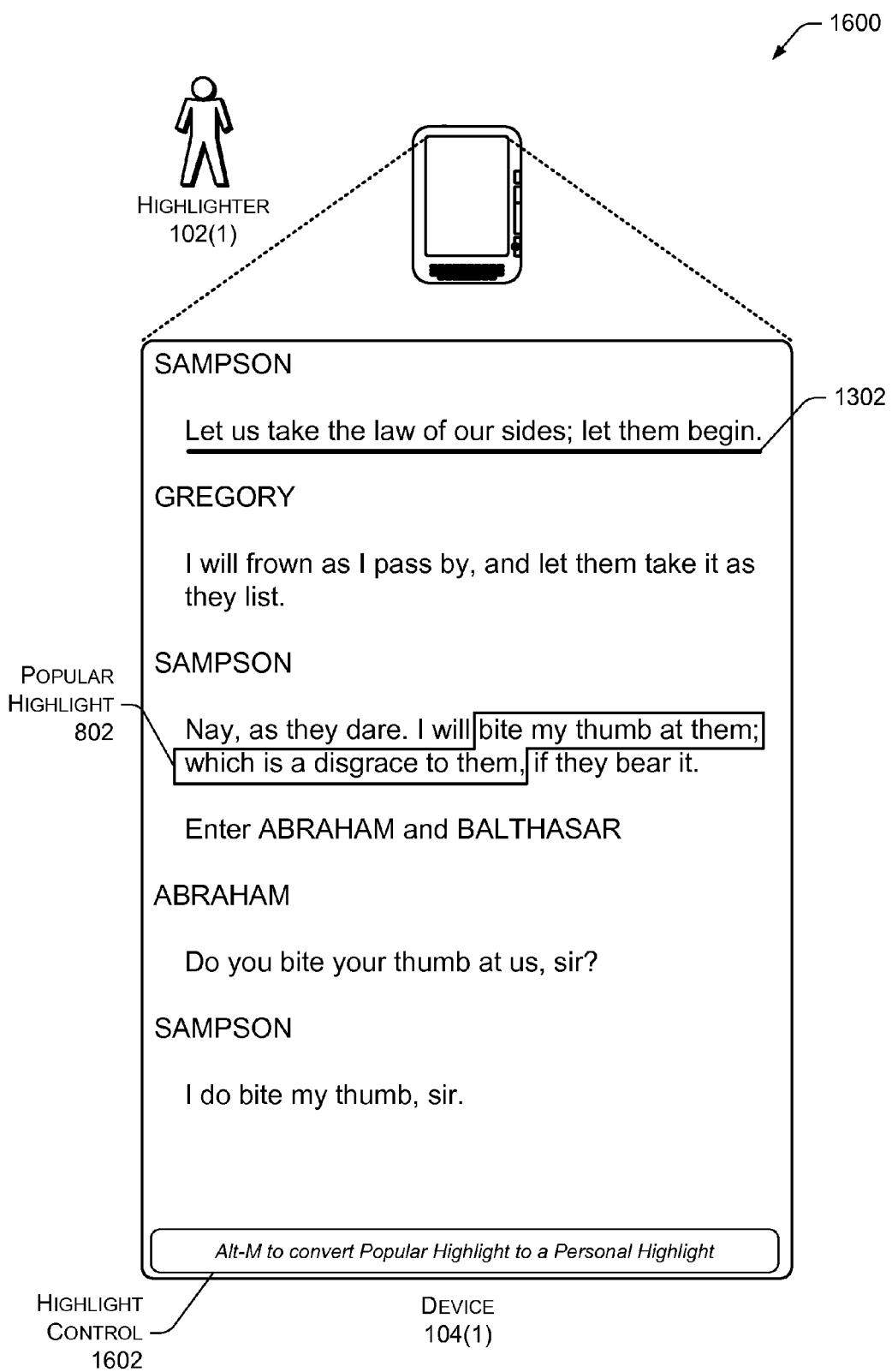
FIGS. 16 and 17 illustrates a UI as rendered on the eBook reader device showing a popular highlight and a highlight control, and a subsequent user highlight generated from the popular highlight.

FIG. 16 illustrates a UI 1600 as rendered on the eBook reader device 104(1) by the HUI module 228 and showing a popular highlight and a highlight control. As described above with regards to FIG. 8, popular highlights may be determined from user highlights entered by a community of users. The popular highlight 802 such as determined above with regards to FIG. 8 is shown as a single-line box surrounding the highlighted text. In other implementations, the highlight prompt may include changing formatting, color, background, underline, and so forth. Also shown in this illustration is the user highlight 1302 as selected above with regards to FIG. 13 by the highlighter 102(1). The highlighter 102(1) has now been presented with the popular highlight 802, and wishes to generate a personal user highlight from this popular highlight 802.

A highlight control 1602 is shown now with a prompt indicating that the user may activate a control, for example "Alt-M" to generate a personal user highlight assigned to the user currently associated with the content which is displayed from the popular highlight. A user may wish to generate a personal user highlight to change the association, presentation, indexing, and so forth. For example, a user may generate an outline of the content using personal user highlights, and wishes the material from the popular highlight to appear in that outline. In some implementations this outline may be generated automatically.

In some implementations, additional user controls may be presented within the highlight control 1602. For example, the user may additionally be presented with controls which, when activated, disable or remove presentation of a particular popular highlight. Thus, a user may remove from presentation a popular highlight which they do not find interesting or relevant.

Figure 17:
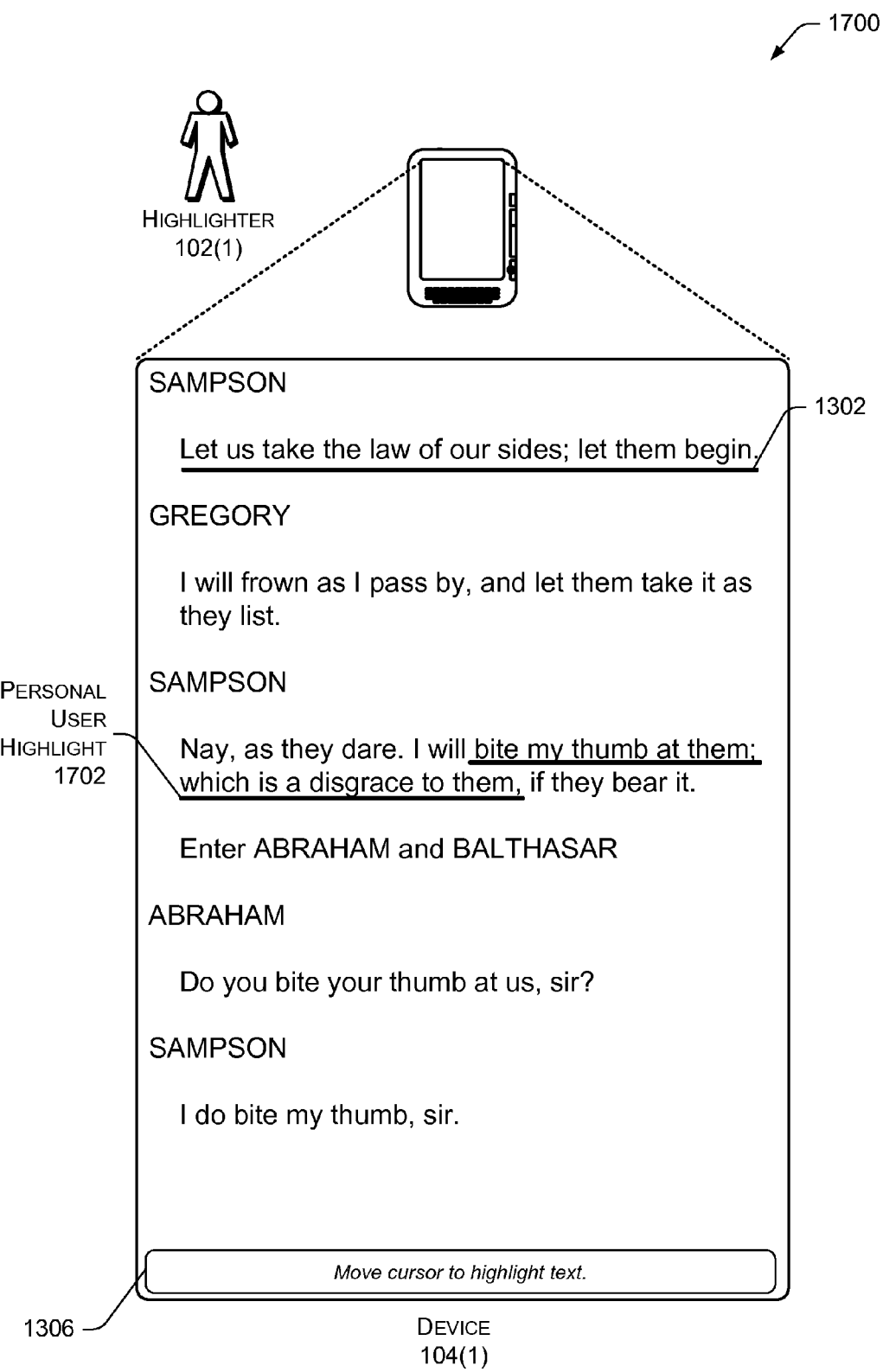

FIG. 17 illustrates a UI 1700 as rendered on the eBook reader device 104(1) by the HUI module 228 and showing a user highlight generated from the popular highlight of FIG. 16 after activating the highlight control 1602. The popular highlight 802 is no longer shown, and instead a personal user highlight 1702, as indicated by the underlining, is now shown for the same positions previously encompassed by the popular highlight 802. Because no further popular highlight are present on the display, the highlight control has returned to the state depicted by 1306. In this state, the user may select highlights by moving a cursor. As discussed above with regards to FIG. 13, the cursor may be manipulated via a touch sensor, button, joystick, mouse, trackball, vocal command, and so forth.

Electronic books, and highlights associated with them may be presented on a variety of devices, as described above with regards to FIG. 1. While the previous illustrations are in the context of an eBook reader device 104(1), other devices such as personal computers 104(D) may also access electronic books and their highlights.

Figure 18:
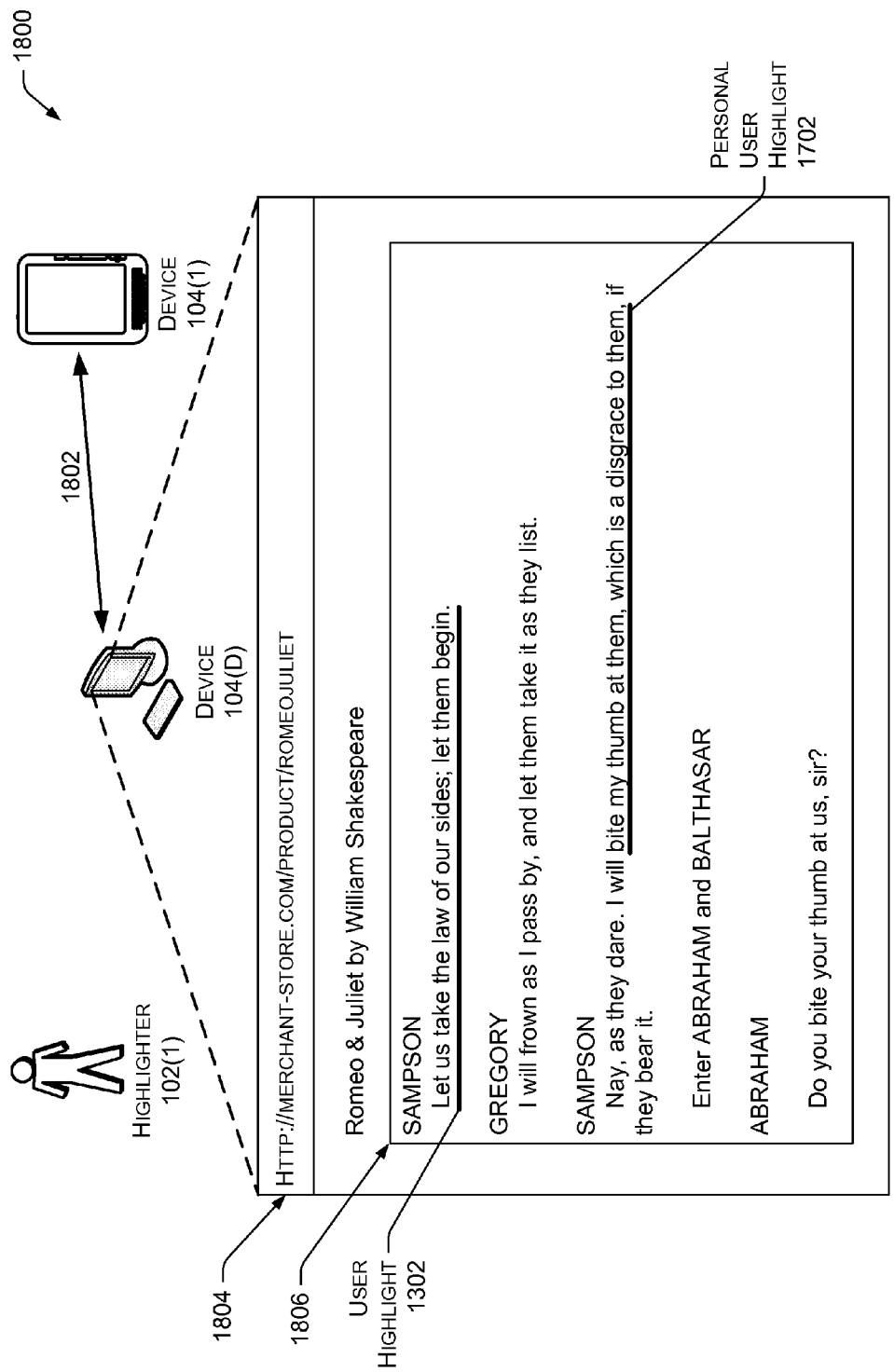
FIG. 18 illustrates a UI as rendered on a personal computer for presenting an electronic book configured to show the passage and user highlights of FIG. 17.

FIG. 18 illustrates a UI 1800 as rendered on the personal computer 104(D) by the HUI module 228 for presenting an electronic book configured to show the passage and user highlights of FIG. 17. The ability to highlight digital content and access both the digital content and the highlights from different devices or locations allows for great flexibility in use. The highlighter user 102 may access their personal user highlights from anywhere the highlight server 110 is accessible. As shown in this illustration, the user highlights including 1302 and 1702 which were originally entered on device 104(1) are visible on the personal computer device 104(D). The user highlights have been synchronized 1802, either directly between devices or via access to the highlight server 110. Within a web browser 1804, the highlighter 102(1) is able to use a reading pane 1806 within the browser 1804 to view his highlights within that book. Likewise, user highlights entered by the highlighter 102(1) within the browser 1804 will be synchronized and accessible on the electronic book reader device 104(1), or other devices such as smartphones, tablets, and so forth.

The synchronization 1802 between electronic devices may be manually initiated by the user, or may automatically occur. For example, the devices may interchange highlight data with the highlight server 110 when connected to the network 108. Thus, users may access their highlights from multiple locations and via multiple devices.

Figure 19:
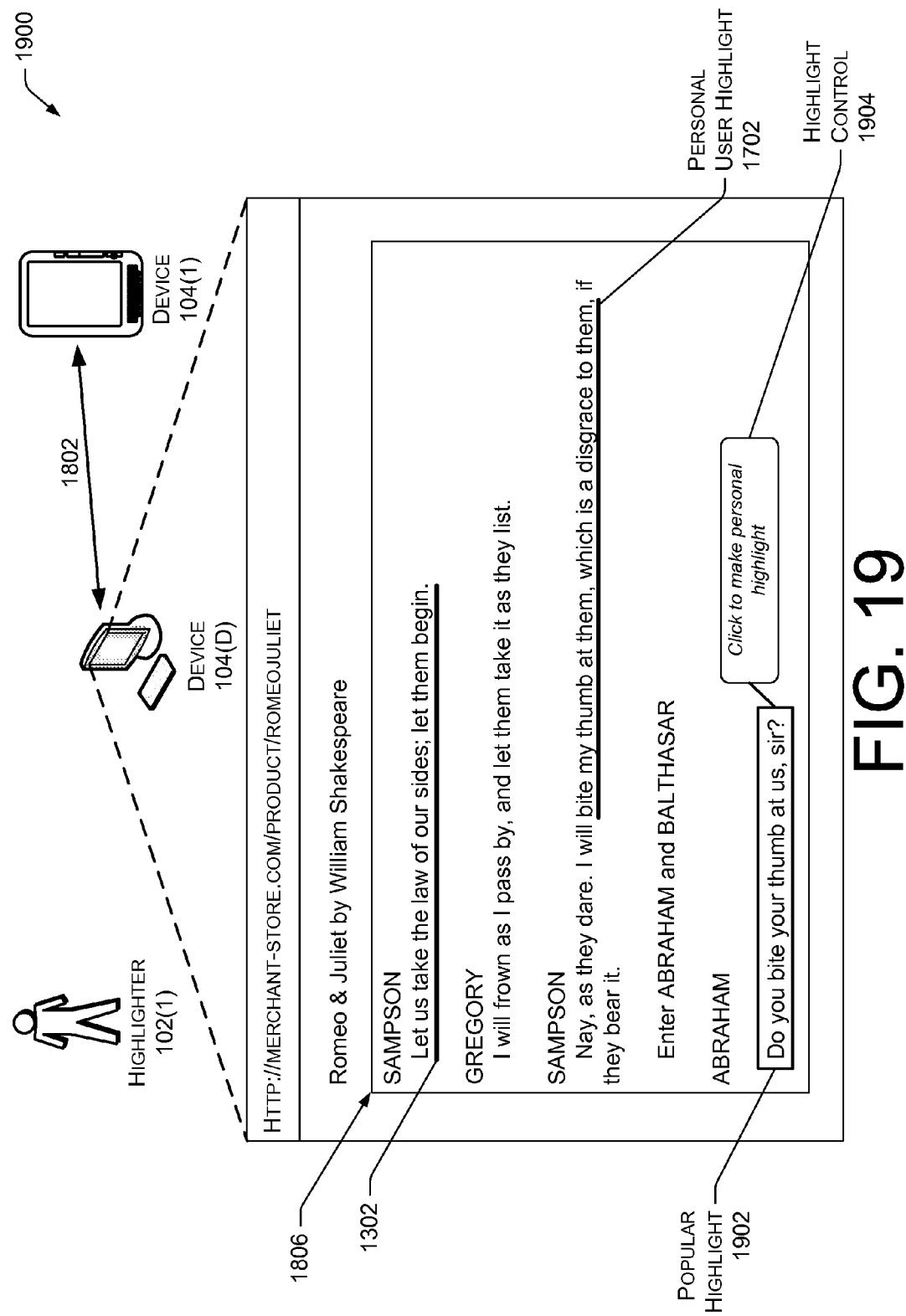
FIGS. 19 and 20 illustrates a UI as rendered on a personal computer for presenting an eBook and configured to show a popular highlight and a highlight control and a subsequent user highlight generated from the popular highlight.

FIG. 19 illustrates a UI 1900 as rendered on the personal computer 104(D) by the HUI module 228 and for presenting an electronic book and configured to show a popular highlight and a highlight control. As shown here, the previous user highlights 1302 and 1702 are present in this passage. Also shown is another popular highlight 1902. A highlight control 1904 may be presented to the user. As described above, this control when activated may be configured to perform actions such as generating a personal user highlight from a selected popular highlight such as 1902.

Figure 20:
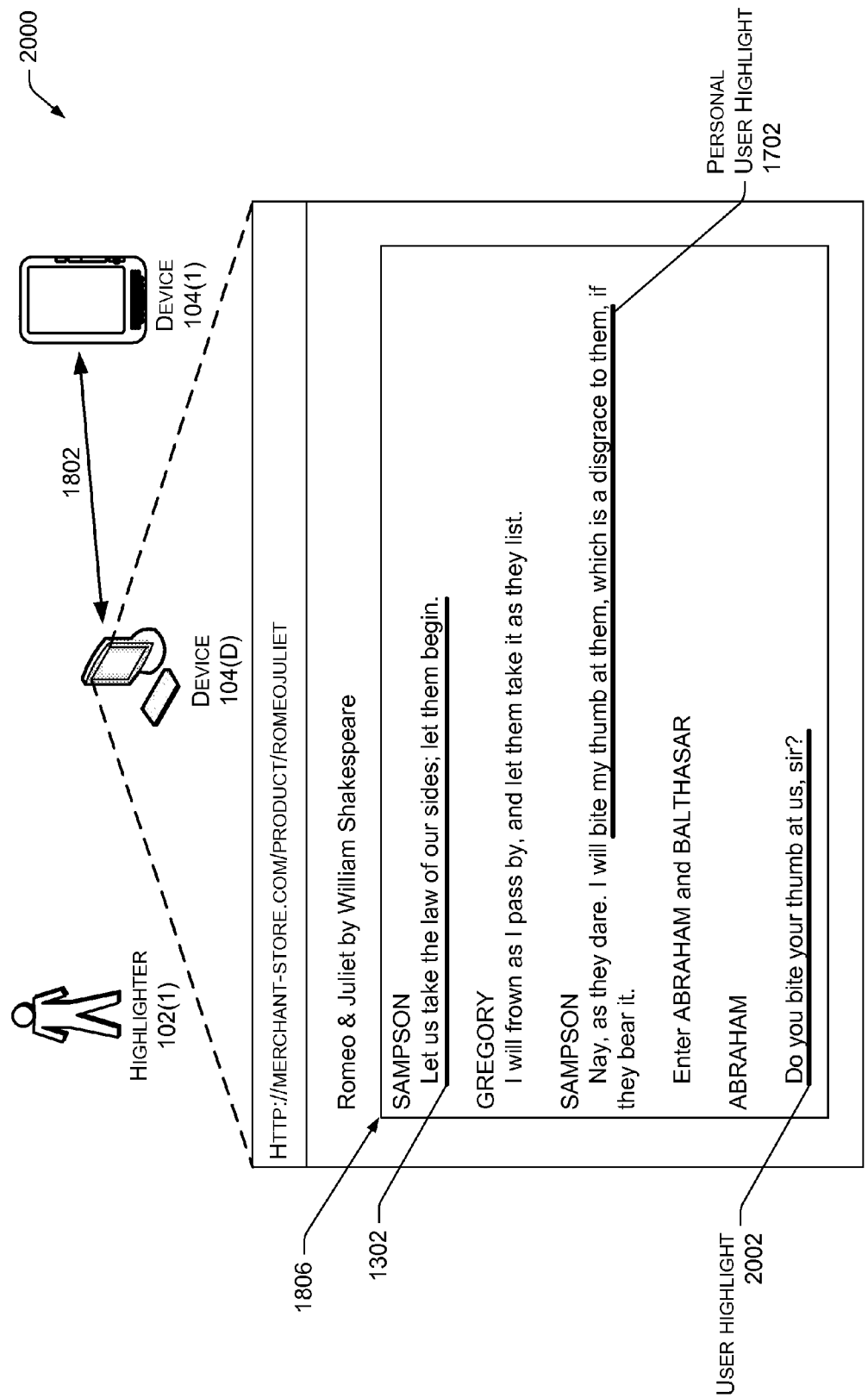

FIG. 20 illustrates a UI 2000 as rendered on the personal computer 104(D) by the HUI module 228 for presenting an electronic book and configured to show the personal user highlights, including one such generated from the popular highlight 1902 of FIG. 19. After activating the highlight control 1904, the user interface is updated to reflect that the highlight is now a user highlight 2002, and presented as such. As described above, this user highlight is then accessible to the user via other devices 104(1)-(D) such as the electronic book reader device 104(1), smartphones, and so forth.

Figure 21:
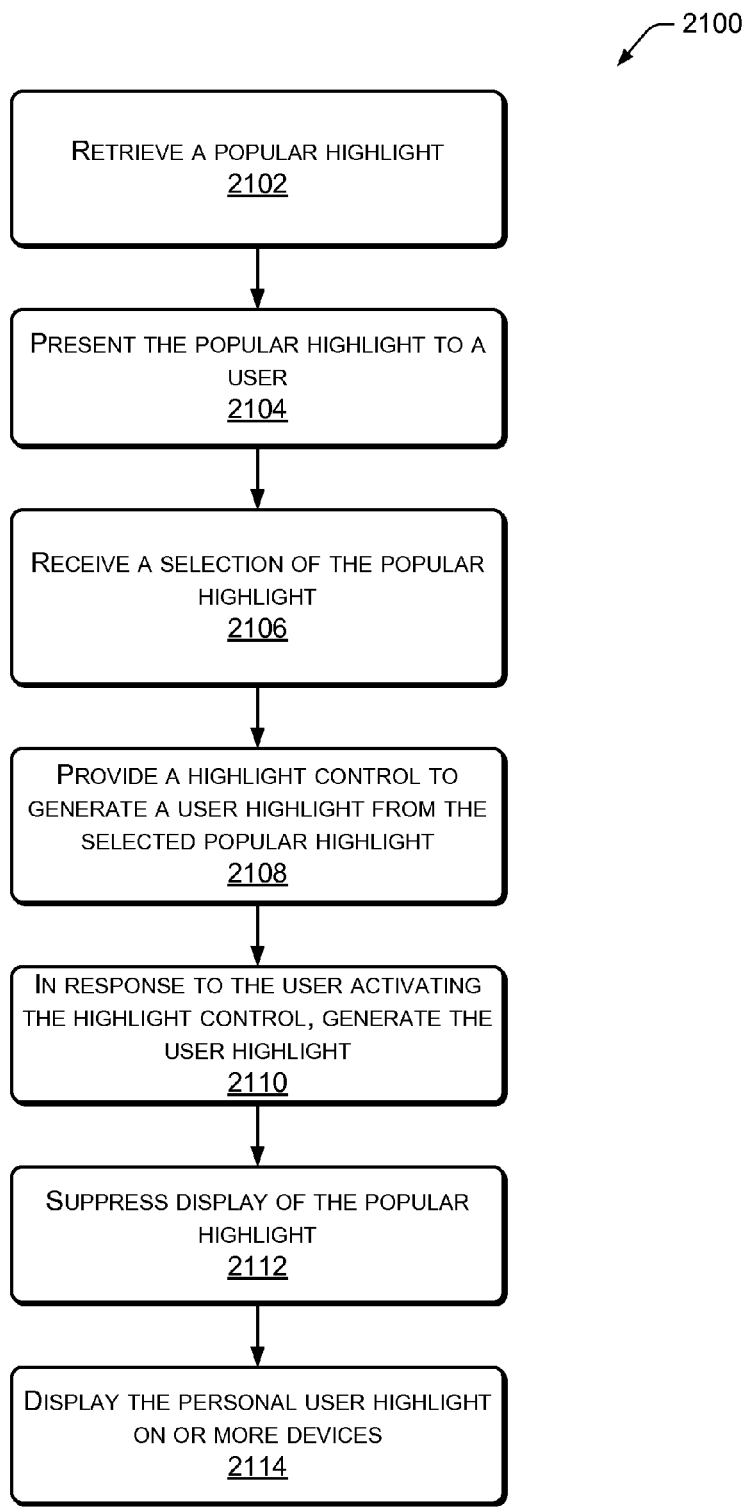
FIG. 21 is a flow diagram of an illustrative process of generating a user highlight from a popular highlight.

FIG. 21 is a flow diagram of an illustrative process 2100 of generating a personal user highlight from a popular highlight. At 2102, the highlight processing module 214 retrieves the popular highlight 802. In some implementations the retrieving of the popular highlight comprises filtering a plurality of popular highlights by a pre-determined time or time interval. For example, popular highlights generated during the previous six months may be retrieved, while older popular highlights are not.

At 2104, the highlight processing module 214 presents the popular highlight 802, such as via the client 222. At 2106, the highlight processing module 214 receives a selection of the popular highlight. At 2108, the highlight processing module 214 or the client 222 provides a highlight control 1602 to the user. The highlight control 1602 is configured to generate a personal user highlight from the selected popular highlight when activated.

At 2110, in response to the user activating the highlight control, the highlight processing module 214 generates the personal user highlight 1702. At 2112, the highlight processing module 214 or the client 222 suppresses display of the popular highlight 802. At 2114, the client 222 displays the personal user highlight 1702.

Highlight Display Configuration

Figure 22:
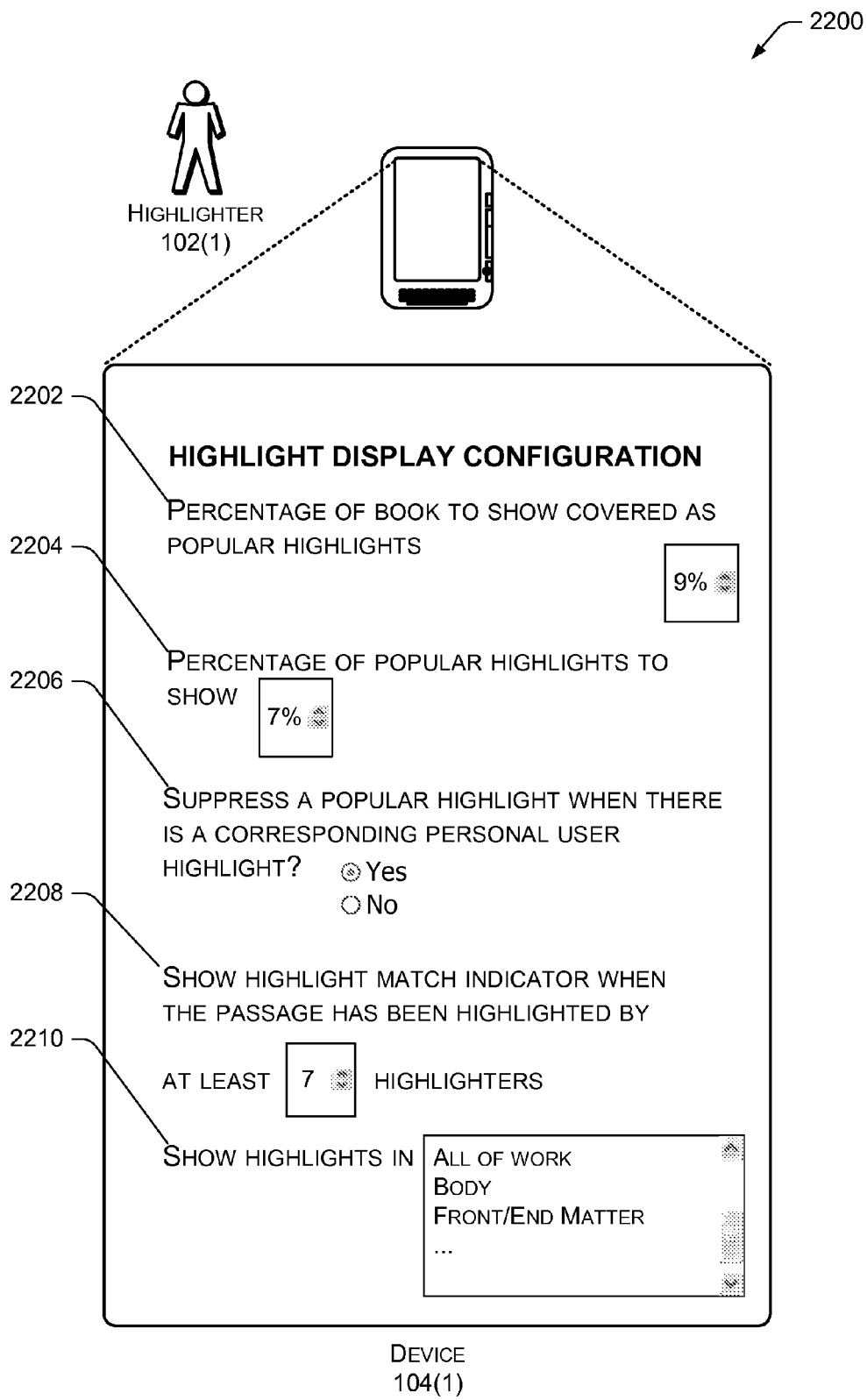
FIG. 22 illustrates a UI as rendered on the eBook reader device showing highlight display configuration controls.

FIG. 22 illustrates a UI 2200 as rendered on the eBook reader device 104(1) by the HUI module 228 and showing highlight display configuration controls. Users may wish to alter the criteria for presentation of the highlight match indicators 1402, the popular highlights 112, and so forth using one or more of the following controls.

A percentage of book control 2202 allows the user to configure what percentage of the book to show covered as popular highlights. For example, as shown here, the user may wish to see no more than 9% of the book highlighted by popular highlights. In some implementations, the user may be able to specify the top or bottom ranked popular highlights, assign different weights to popular, user or other highlight types, specify different percentages for different portions of the content, and so forth.

A popular highlight control 2204 allows the user to configure what percentage of popular highlights to show. For example, as shown here the user will see 7% of the popular highlights. In some implementations this control may work in conjunction with, override, or be overridden by the percentage of book control 2202. Also, as above with regards to control 2202, in some implementations the user may be able to specify the top or bottom ranked popular highlights, different percentages for different portions of the content, and so forth.

A popular highlight suppression control 2206 allows the user to configure whether to continue to show a popular highlight indicator after generating a personal user highlight from the popular highlight. For example, the user may choose to suppress popular highlight indicators, so only the personal user highlight indicator is presented. Likewise, the user may choose to view both indicators, providing feedback that the given highlight is popular and also a personal user highlight. Thus the popular user highlight 1702 as described above may be presented to the user on the device 104 as underlined which designates a personal user highlight and simultaneously with single-line box surrounding the highlighted text which designates a popular highlight.

A highlight match indicator control 2208 allows the user to configure when the highlight match indicator 1402 is presented. In this illustration, the highlighter 102(1) has set the control to show the highlight match indicator when the highlighted passage has been highlighted by at least seven other people. This control thus allows the user to set the pre-determined threshold number of previously stored user highlights.

A highlight filter control 2210 allows the user to select where within the book highlights to present highlights. In this illustration, the control 2210 allows the user to select whether to show highlights in all of the work, in a body or main text, front matter/end matter, and so forth.

In some implementations, additional controls may be presented. For example, a highlight match indicator threshold may be set. Thus, a highlight match may be presented when the personal user highlight matches to a pre-determined degree other community highlights, rather than requiring an exact match.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A computer-implemented method comprising:
   under control of a computing system configured with executable instructions, performing the following:
   receiving an input indicating a percentage of popular highlights of a digital content that is to be presented;
   based at least in part on receiving the input, presenting a popular highlight of the popular highlights of the digital content on a device within a user interface;
   accepting a user input via the user interface to select the popular highlight, the popular highlight comprising an interval of at least a portion of the digital content;
   accepting a user input via the user interface to generate a personal user highlight from the popular highlight; and
   in response to accepting the user input via the user interface to generate the personal user highlight, suppressing presentation of the popular highlight and presenting the personal user highlight within the user interface.

2. The computer-implemented method of claim 1, wherein the presenting the personal user highlight comprises altering a highlight prompt of the popular highlight from a first state to a second state.

3. The computer-implemented method of claim 2, wherein the highlight prompt comprises formatting, text color, background color, box, or underline.

4. The computer-implemented method of claim 2, wherein the first state comprises a box and the second state comprises an underline.

5. The computer-implemented method of claim 1, wherein the digital content comprises an electronic book.

6. The computer-implemented method of claim 1, wherein the presenting comprises generating an image upon an electrophoretic display.

7. The computer-implemented method of claim 1, further comprising:
   providing a first control to a user to select a first option or a second option, wherein a selection of the first option suppresses display of a specific popular highlight when a specific personal highlight is generated from the specific popular highlight, and wherein a selection of the second option allows display of the specific popular highlight when the specific personal highlight is generated from the specific popular highlight,
   wherein suppressing presentation of the popular highlight and presenting the personal user highlight within the user interface comprises, in response receiving an input indicating a selection of the first option, suppressing presentation of the popular highlight and presenting the personal user highlight within the user interface.

8. The computer-implemented method of claim 1, wherein suppressing presentation of the popular highlight and presenting the personal user highlight within the user interface further comprises:
   receiving an input to suppress display of a specific popular highlight when a specific personal highlight is generated from the specific popular highlight; and
   in response to receiving the input to suppress display of the specific popular highlight when the specific personal highlight is generated from the specific popular highlight, suppressing presentation of the popular highlight and presenting the personal user highlight within the user interface.

9. The computer-implemented method of claim 1, wherein presenting the popular highlight of the popular highlights of the digital content further comprises:
   determining, from the plurality of popular highlights of the digital content, a subset of the popular highlights that were generated during a specified time interval; and
   based at least in part on determining the subset of the popular highlights, presenting the popular highlight such that the presented popular highlight is included in the subset of the popular highlights.

10. The computer-implemented method of claim 1, wherein the popular highlight is derived at least in part from a plurality of user highlights acquired from a plurality of users.

11. The computer-implemented method of claim 1, wherein presenting the popular highlight further comprises filtering a plurality of popular highlights by a pre-determined time interval.

12. The computer-implemented method of claim 1, wherein the personal user highlight generated from the popular highlight has an interval that is same as the interval of the popular highlight.

13. A computer-readable non-transitory storage medium storing instructions that when executed instruct a processor to perform acts comprising:
   receiving an input indicating a percentage of popular highlights of digital content that is to be presented;
   based at least in part on receiving the input, presenting a popular highlight of the popular highlights of the digital content on a device within a user interface;
   accepting a user input via the user interface to select the popular highlight, the popular highlight comprising an interval of at least a portion of the digital content;
   accepting a user input via the user interface to generate a personal user highlight from the popular highlight; and
   in response to accepting the user input via the user interface to generate the personal user highlight, suppressing presentation of the popular highlight and presenting the personal user highlight within the user interface.

14. The computer-readable non-transitory storage media of claim 13, wherein the presenting the personal user highlight comprises altering a highlight prompt of the popular highlight from a first state to a second state.

15. The computer-readable non-transitory storage media of claim 14, wherein the highlight prompt comprises formatting, text color, background color, box, or underline.

16. The computer-readable non-transitory storage media of claim 13, wherein the digital content comprises an electronic book.

17. A system comprising:
a processor;
a memory, coupled to the processor; and
a highlight processing module stored within the memory and executable by the processor, wherein the highlight processing module programs the processor to:
receive an input indicating a percentage of popular highlights of a digital content that is to be presented;
based at least in part on receiving the input, present a popular highlight of the popular highlights of the digital content;
accept a user input via the user interface to select the popular highlight;
accept a user input via the user interface to generate a personal user highlight from the popular highlight; and
in response to accepting the user input via the user interface to generate the personal user highlight, suppress presentation of the popular highlight and present the personal user highlight.

18. The system of claim 17, further comprising a display on which the personal user highlight is presented.

19. The computer-implemented method of claim 17, wherein the digital content comprises an electronic book.

20. The system of claim 17, wherein the highlight processing module further programs the processor to:
provide a first control to a user to select a first option or a second option, wherein a selection of the first option suppresses display of a specific popular highlight when a specific personal highlight is generated from the specific popular highlight, and wherein a selection of the second option allows display of the specific popular highlight when the specific personal highlight is generated from the specific popular highlight; and
in response receiving an input indicating a selection of the first option, suppress presentation of the popular highlight and present the personal user highlight.

21. The system of claim 17, wherein the highlight processing module is further configured to present the popular highlight of the popular highlights of the digital content by:
determining, from the plurality of popular highlights of the digital content, a subset of the popular highlights that were generated during a specified time interval; and
based at least in part on determining the subset of the popular highlights, presenting the popular highlight such that the presented popular highlight is included in the subset of the popular highlights.

\* \* \* \* \*